(12) United States Patent
Randall et al.

(10) Patent No.: US 8,906,818 B2
(45) Date of Patent: Dec. 9, 2014

(54) HIGH ENERGY DENSITY IONIC DIELECTRIC MATERIALS AND DEVICES

(75) Inventors: Clive A. Randall, State College, PA (US); Leslie E. Cross, State College, PA (US); Aram Yang, Berkeley, CA (US); Niall J. Donnelly, San Mateo, CA (US); Ramakrishnan Rajagopalan, State College, PA (US); Amanda Lou Baker, Boalsburg, PA (US)

(73) Assignees: Recapping, Inc., Menlo Park, CA (US); Penn State Research Foundation, University Park, PA (US)

( * ) Notice: Subject to any disclaimer, the term of this patent is extended or adjusted under 35 U.S.C. 154(b) by 518 days.

(21) Appl. No.: 12/924,908

(22) Filed: Oct. 7, 2010

(65) Prior Publication Data

US 2011/0212382 A1    Sep. 1, 2011

Related U.S. Application Data

(60) Provisional application No. 61/278,867, filed on Oct. 13, 2009, provisional application No. 61/303,644, filed on Feb. 11, 2010.

(51) Int. Cl.
C04B 35/00    (2006.01)
H01M 8/10    (2006.01)
H01M 4/48    (2010.01)

(52) U.S. Cl.
USPC ............ 501/138; 501/139; 429/482; 429/489

(58) Field of Classification Search
USPC ................. 501/134, 135, 136, 137, 138, 139; 429/489, 482, 488
See application file for complete search history.

(56) References Cited

U.S. PATENT DOCUMENTS

| 4,863,883 | A | * | 9/1989 | Menashi et al. | 501/138 |
| 5,751,540 | A | * | 5/1998 | Lee et al. | 361/321.4 |
| 6,117,595 | A | | 9/2000 | Takeuchi et al. | |
| 2001/0048969 | A1 | * | 12/2001 | Constantino et al. | 427/215 |
| 2009/0110996 | A1 | * | 4/2009 | Shim et al. | 429/33 |
| 2010/0209779 | A1 | * | 8/2010 | Wendman | 429/310 |

FOREIGN PATENT DOCUMENTS

| EP | 1029837 | 8/2000 |
| JP | 2005-336022 | 12/2005 |

OTHER PUBLICATIONS

Slodczyk et al. Phase transitions in the H+-conducting perovskite ceramics by the quasi-elastic neutron and high-pressure Raman scattering. Ionics (2008) 14:215-222.*
Nowick et al. High-temperature protonic conductors with perovskite-related structures. Solid State Ionics 77 (1995) 137-146.*
Kreuer, Solid State Ionics, 125 (1999) 285-302.
Murugaraj et al, Solid State Ionics 98 (1997) 1-6.
Babilo et al, J. Mater. Res., vol. 22, No. 5, May 2007.

* cited by examiner

*Primary Examiner* — Noah Wiese
(74) *Attorney, Agent, or Firm* — Law Offices of John A. Parrish

(57) ABSTRACT

Dielectric compositions that include compound of the formula $[(M')_{1-x}(A')_x][(M'')_{1-y-z}(B'')_y(C'')_z]O_{3-\delta}(V_O)_\delta$ and protonated dielectric compositions that include a protonated dielectric compound within the formula $[(M')_{1-x}(A')_x]$ $(M'')_{1-y-z}(B'')_y(C'')_z]O_{3-\delta+h}(V_O)_\delta(H^+)_{2h}$ are disclosed. Composite materials that employ one or more of these dielectric compounds together with an electrolyte also are disclosed. Composite material that employs one or more of these dielectric compounds together with an electrochemally active material also are disclosed.

16 Claims, 10 Drawing Sheets

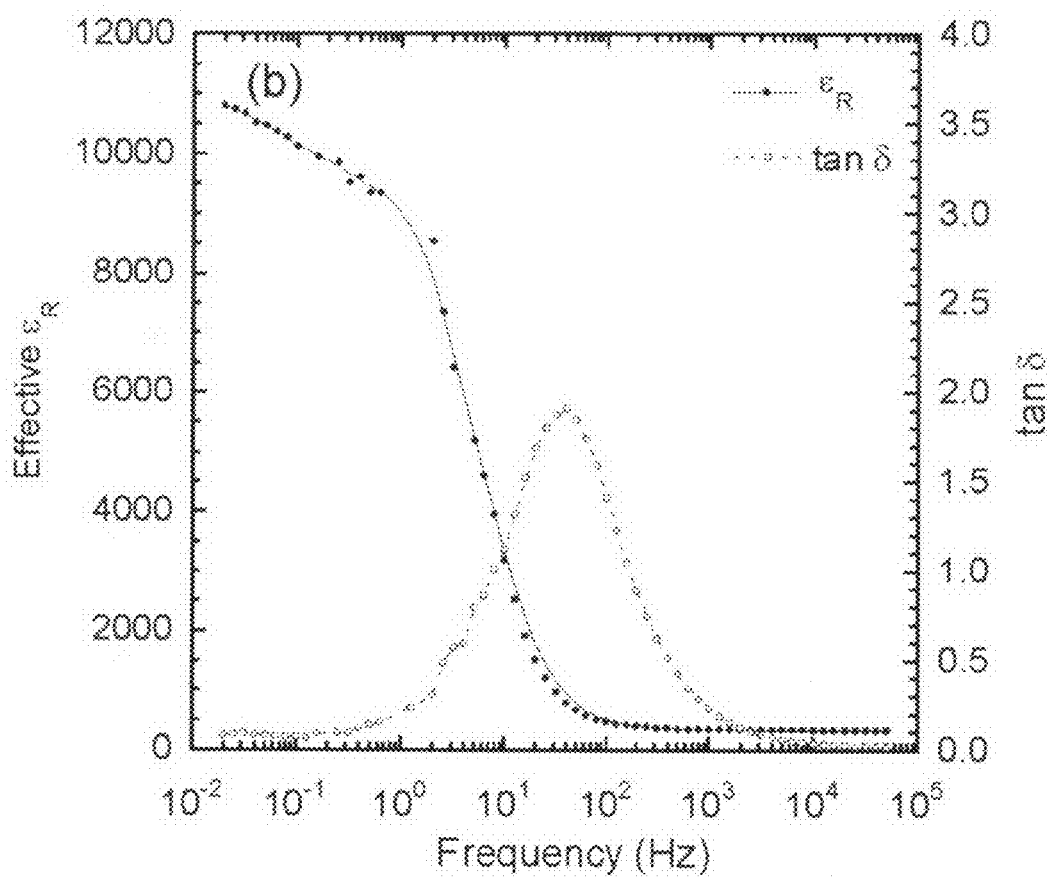

HIGH ENERGY DENSITY IONIC DIELECTRIC MATERIALS AND DEVICES

REFERENCE TO RELATED APPLICATIONS

This application claims priority to U.S. Provisional Application 61/278,867 filed Oct. 13, 2009 and to U.S. Provisional Application 61/303,644 filed Feb. 11, 2010, the teachings of which are incorporated herein by reference in their entirety.

BACKGROUND OF THE INVENTION

In traditional barrier layer, polycrystalline dielectrics, electrons are the mobile species. Use of electrons as the mobile species enables these dielectrics to achieve relatively high frequency response. The operating voltage of these dielectrics, however, is limited by electric field drop across grain boundaries as well as by tunneling of electrons across grain boundaries. This, in turn, limits the capacitive energy density that can be achieved.

Typical barrier layer dielectrics provide effective relative permittivities of about 20,000 to 100,000. The energy storage capacity of these dielectrics however, is limited by electron tunneling at the grain boundaries under high electric fields. Also, typical barrier layer dielectrics are only able to withstand low voltages of about 3 Volts.

Commercial barrier layer dielectrics are based on semiconducting dielectric grains that have resistive grain boundaries and display a heterogeneous distribution of resistivity. These dielectrics utilize a space charge under electric field bias to develop a polarizable dielectric that has segregated charge distributions. The dielectric grains in commercial, polycrystalline barrier dielectrics have high conductivities and typically are n-type. The grain boundaries in these dielectrics, however, are more resistive than the grains and have a double Schottky barrier potential. This limits DC conduction through the polycrystalline dielectric until tunneling occurs across the grain boundaries under high electric field bias.

The art has attempted to reduce the probability of electron tunneling by addition of a more resistive phase such as silica or alumina at the grain boundaries of the dielectric. Breakdown, however, nevertheless is controlled by electronic conduction across grain boundaries.

A need therefore exists for new materials that address these deficiencies.

A further need exists for devices that may employ these new materials such as in high energy density storage applications.

BRIEF DESCRIPTION OF THE DRAWINGS

FIG. 2A and FIG. 2B show measured relative permittivity $\epsilon_r$ and loss tangent (tan $\delta$) of $Ba(Sc_{0.1}(Ti_{0.85}Zr_{0.15})_{0.9})O_3$ dielectric before and after protonation, respectively;

SUMMARY OF THE INVENTION

Figure 1:
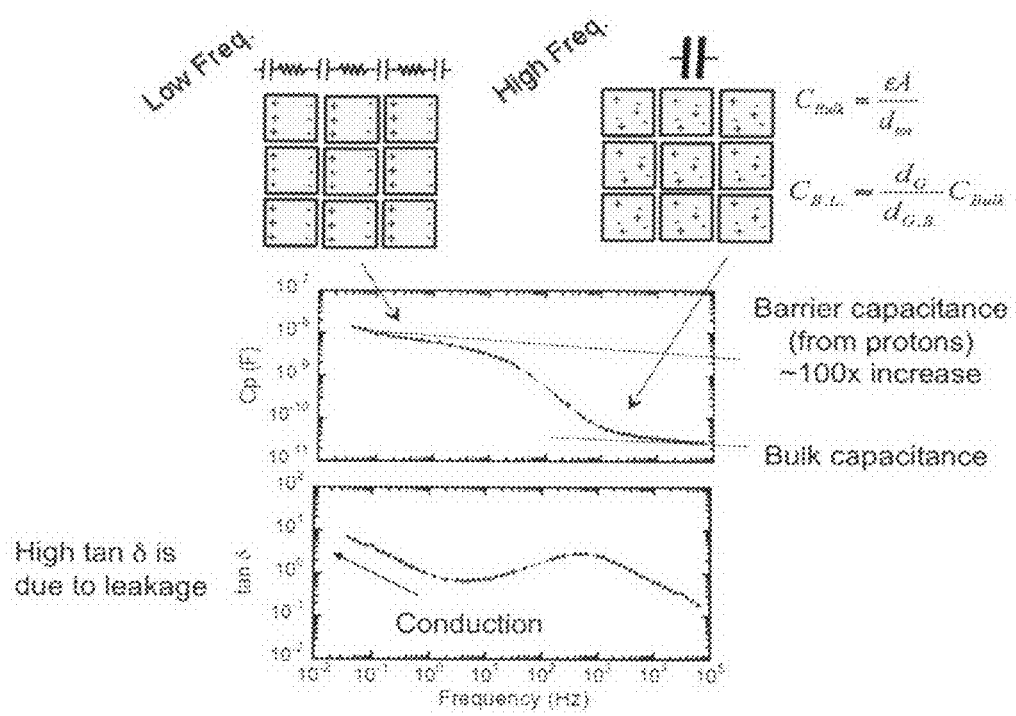
FIG. 1 is a schematic of a barrier layer capacitor and impedance data that shows enhanced capacitance at low frequencies in protonated $Ba(Zr_{0.8}Y_{0.2})O_3$.
Figure 1A:
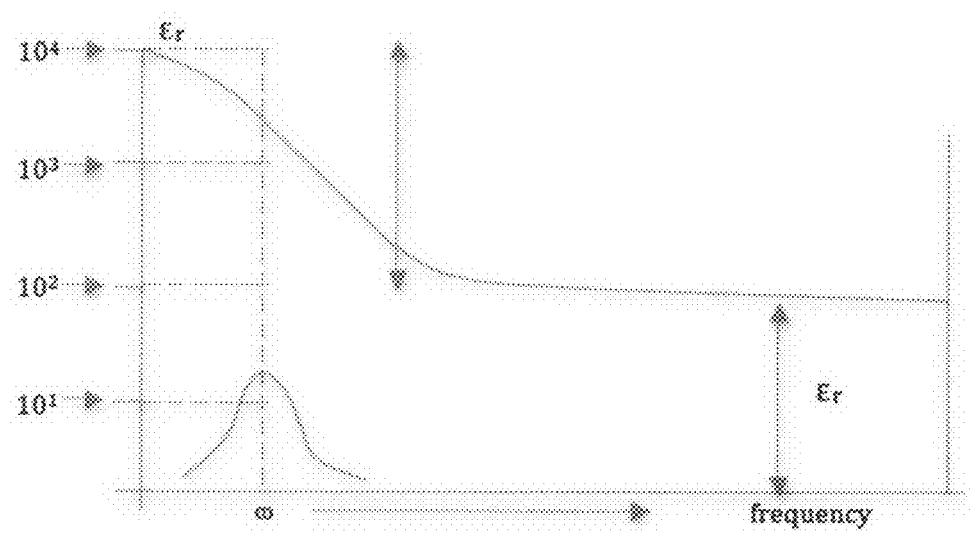
FIG. 1A is a schematic representation of dielectric relaxation expressed in the frequency domain.

In a first aspect, the invention relates to ionically conducting dielectric materials. The ionically conducting dielectric materials may have heterogeneously distributed conductivity that may generate barrier layer effects. The ionically conducting dielectric materials may employ ionic species such as but not limited to $H^+$, $Li^+$, $Na^+$, $Ag^+$ and $O^{2-}$ and combinations thereof as primary charge carriers. The ionically conducting dielectric materials advantageously may enable reduced tunneling probability of ionic species and increased breakdown voltages of grains relative to electronically conducting barrier layer capacitors. Where $Li^+$, $Na^+$, $Ag^+$ and $O^{2-}$ are employed as ionic conducting charge carrier species, these species, when subjected to an applied voltage, may accumulate at grain boundary regions to generate an Ionic-Based-Barrier-Layer (IBBL) effect. This IBBL effect may generate an effective barrier layer capacitance. Ionic species such as $H^+$, $Li^+$, $Na^+$, $Ag^+$, $O^{2-}$ may be distributed uniformly within a shell region of an ionically conducting grain within the grain, or may be heterogeneously distributed within the grain. Where $H^+$ is employed as ionic species, H+ may accumulate at grain boundaries to generate a type of IBBL effect hereinafter referred to as a Proton-Based-Barrier-Layer (PBBL) effect.

In a second aspect, the invention relates to a composite material where the grain boundaries of the ionically conducting dielectric material bear one or more electrochemically active materials that may interact with one or more of the ionic charge carrier species in the dielectric grain. The composite material thereby may generate pseudocapacitance at interfaces between grains and the electrochemically active materials to enable achievement of increased energy storage capacity.

Ionically conducting dielectric materials that show an IBBL effect such as a PBBL effect may include an ionically conducting grain such as a protonated dielectric grain alone, or in combination with one or more electrochemically active grain boundary compounds or compositions. Where an ionically conducting grain such as a protonated grain is employed in combination with one or more electrochemically active grain boundary compounds or compositions, the resulting combination may advantageously combine electrostatic and electrochemical charge storage mechanisms. The presence of electrochemically active grain boundary compounds such as metal hydroxides such as $Al(OH)_3$ at the grain boundaries may enable generation of electrochemical reactions and pseudo capacitance.

Ionically conducting dielectric materials such as those that generate an IBBL effect such as a PBBL effect may achieve high charge carrier ionic species concentrations of about $10^{18}$ $cm^{-3}$ to about $10^{21}$ $cm^{-3}$ Where $H^+$ is the ionic species, $H^+$ carrier concentration of about $10^{18}$ $cm^{-3}$ to about $10^{21}$ $cm^{-3}$ may be achieved with little or no transformation of the protonated dielectric to a metallically conducting phase.

Ionically conducting dielectric materials such as those that generate an IBBL effect such as a PBBL effect advantageously may minimize tunneling across grain boundaries at voltages of up to about five volts per grain boundary and/or tan δ of less than about 0.1 at about 2 MV/m. Ionically conducting dielectric materials such as those that generate an IBBL effect such as a PBBL effect also may achieve higher voltage operation compared to dielectrics that employ electrons for charge transport. Ionically conducting dielectric materials such as those that generate an IBBL effect such as a PBBL effect also may achieve interfacial polarizations that have effective relative permittivities of about $1\times10^4$ to about $5\times10^5$ and relaxation times of about 10 s to about 0.1 ms, as well as low frequency operation at about $10^{-3}$ Hz to about 100 Hz. Ionically conducting dielectric materials such as those that generate an IBBL effect such as a PBBL effect also may avoid degradation under an electric field bias that may occur in $BaTiO_3$ based dielectrics when electrons are the primary carrier species.

Ionically conducting dielectric materials such as those that generate an IBBL effect such as a PBBL effect may be utilized as low frequency, high field dielectrics. Ionically conducting dielectric materials such as those that generate an IBBL effect such as a PBBL effect such as protonated $Ba(Sc_{0.1}(Ti_{0.85}Zr_{0.15})_{0.9})O_3$ of example 2 also may show improved energy storage properties. Ionically conducting dielectric materials such as those that generate an IBBL effect such as a PBBL effect also may be insensitive to voltage and may achieve energy densities of up to about 100 J/cc or more. Ionically conducting dielectric materials such as those that generate an IBBL effect such as a PBBL effect may employ protonated dielectrics such as protonated $Ba(Sc_{0.1}(Ti_{0.85}Zr_{0.15})_{0.9})O_3$ of example 2 at applied electric fields of about 1 MV per meter or more for use in specialized energy storage applications such as supercapacitors.

In a third aspect, the invention relates to devices such as capacitors and electrochemical cells that employ ionically conducting dielectric materials that show an IBBL effect such as a PBBL effect. Advantageously, ionically conducting dielectric materials such as those that generate an IBBL effect such as a PBBL effect such as protonated $Ba(Sc_{0.1}(Ti_{0.85}Zr_{0.15})_{0.9})O_3$ of example 2 may be employed in devices such as hybrid electric vehicles, actuators, electronics (computers, flash and video cameras, etc), military and aerospace applications, and down-hole oil and gas exploration technology.

In a fourth aspect, the invention relates to composite materials that employ ionically conductive dielectric materials such as composites of ionically conductive dielectric materials and insulative materials The invention further relates to a dielectric composition that includes a compound within the formula $(M')_{1-x}(A')_x][(M'')_{1-y-z}(B'')_y(C'')_z]O_{3-\delta}(V_o)_\delta$ where $0.0\le x\le 0.4$, $0.00\le b\le 0.99$, $0.00\le y\le 0.40$, $0.00\le z\le 0.40$, M' is Ba, Mg, Ca, Sr, Pb and mixtures thereof, A' is any of K, Na, Li, Ag and mixtures thereof, M" is any of Ti, Zr, Hf, Ce, Sn, $(Mg_{1/3},Nb_{2/3})$, $(Zn_{1/3},Nb_{2/3})$, $(Sc_{1/2},Ta_{1/2})$ and mixtures thereof, B" is any of Sc, Al, Y, La, Fe, Yb, Ho, Tm, Sb, Sm, Nd, Gd, Er, Pr, Mo, Dy and mixtures thereof, C" is any of V, Mn, Cr, Fe, Ni, Cu, Zn, Ca, Mg and mixtures thereof, $(VO)_\delta$ represents oxygen vacancies and $\delta\le 0.5x+0.5y+z$.

The invention further relates to protonated dielectric compound within the formula $[(M')_{1-x}(A')_x](M'')_{1-y-z}(B'')_y(C'')_z]O_{3-\delta+h}(V_o)_\delta(H^*)_{2h}$ where $0.0\le x\le 0.4$, $0.00\le b\le 0.99$, $0.00\le y\le 0.40$, $0.00\le z\le 0.40$, M' is any of Ba, Mg, Ca, Sr, Pb and mixtures thereof, A' is any of K, Na, Li, Ag and mixtures thereof, M" is any of Ti, Zr, Hf, Ce, Sn, $(Mg_{1/3},Nb_{2/3})$, $(Zn_{1/3},Nb_{2/3})$, $(Sc_{1/2},Ta_{1/2})$ and mixtures thereof, B" is any of Sc, Al, Y, La, Fe, Yb, Ho, Tm, Sb, Sm, Nd, Gd, Er, Pr, Mo, Dy and mixtures thereof, C" is any of V, Mn, Cr, Fe, Ni, Cu, Zn, Ca, Mg and mixtures thereof, $(VO)_\delta$ represents oxygen vacancies and $0.00<h\le\delta\le 0.5x+0.5y+z$. The protonated dielectric compound may be any of protonated $Ba(Sc_{0.1}(Ti_{0.85}Zr_{0.15})_{0.9})O_3$, protonated $Ba(Sc_{0.1}Ti_{0.9})O_3$, protonated $Ca(Sc_{0.1}(Ti_{0.85}Zr_{0.15})_{0.9})O_3$, protonated $Pb(Sc_{0.1}(Ti_{0.85}Zr_{0.15})_{0.9})O_3$ and protonated $Ba(Zr_{0.8}Y_{0.2})O_3$.

The invention also relates to a protonated dielectric compound within the formula $(A_{1-x}A'_x)(B_{1-y-z}B''_yC''_z)O_3H^*_{(x+y+2z)}$ where $0.00<x<0.40$, $0.00<y<0.40$, $0.00<z<0.40$, A is any of Ba, Mg, Ca, Sr, Pb and mixtures thereof, A' is any of K, Na, Li, Ag and mixtures thereof, B is any of Ti, Zr, Hf, Sn, $(Mg_{1/3},Nb_{2/3})$, $(Zn_{1/3},Nb_{2/3})$, $(Sc_{1/2},Ta_{1/2})$ and mixtures thereof, B" is any of Sc, Y, La, Fe, Yb, Ho, Tm, Sb, Sm, Nd, Gd, Er, Pr, Mo, Dy and mixtures thereof, C" is any of V, Mn, Cr, Fe, Ni, Cu, Ca, Mg and mixtures thereof, and H* is a proton.

The invention further relates to a method for manufacture of a protonated compound within the formula $[(M')_{1-x}(A')_x](M'')_{1-y-z}(B'')_y(C'')_z]O_{3-\delta+h}(V_o)_\delta(H^*)_{2h}$ where $0.0\le x\le 0.4$, $0.00\le b\le 0.99$, $0.00\le y\le 0.40$, $0.00\le z\le 0.40$, M' is any of Ba, Mg, Ca, Sr, Pb and mixtures thereof, A' is any of K, Na, Li, Ag and mixtures thereof, M" is any of Ti, Zr, Hf, Ce, Sn, $(Mg_{1/3},Nb_{2/3})$, $(Zn_{1/3},Nb_{2/3})$, $(Sc_{1/2},Ta_{1/2})$ and mixtures thereof, B" is any of Sc, Al, Y, La, Fe, Yb, Ho, Tm, Sb, Sm, Nd, Gd, Er, Pr, Mo, Dy and mixtures thereof, C" is any of V, Mn, Cr, Fe, Ni, Cu, Zn, Ca, Mg and mixtures thereof, $(VO)_\delta$ represents oxygen vacancies, $\delta\le 1.5x+0.5y+z$, H* is a proton and $0.00<h\le\delta\le 0.5x+0.5y+z$. The method entails forming a mixture of including oxides or precursors of oxides of Ba, Ti and dopant oxide, combining the mixture with a liquid to form a slurry, calcining the slurry to form a calcined product, milling the calcined product to produce a milled powder, compressing the milled powder to form a preform, sintering the preform at a temperature of about 1000° C. to about 1500° C. to produce a sintered product, exposing the sintered product to steam at about 20° C. to about 700° C. at about 0.1 PSI to about 100 PSI for about 1 hr to about 24 hrs.

The invention also relates to a composite material that includes a dielectric material for generating an IBBL effect and an electrolyte wherein the electrolyte is any of ionomeric electrolytes, solid-state protonic electrolytes and mixtures thereof. The ionomeric electrolyte is any of tetrafluoroethylene-perfluoro-3,6-dioxa-4-methyl-7-octenesulfonic acid copolymer, poly(ethylene-co-methacrylic acid, polyethylene oxide, polyvinylidene fluoride, and mixtures thereof. The solid-state ionomer electrolyte is any of layered double hydroxides, ion-conducting glass, conductive ceramics and mixtures thereof and the dielectric materials are any of lithium ion conducting dielectric materials, silver ion conducting dielectric materials, sodium ion conducting dielectric materials, oxygen ion conducting dielectric materials and mixtures thereof. The lithium ion conducting material may have the formula $(Li,M)TiO_3$ where M is any of La, Ce, Pr, Nd, and combinations thereof. The lithium ion conducting material also may have the formula $LiMO_4$ where M is a transition metal selected from the group consisting of Co, Mn, Fe, Ni, Cu, Cr, V, or combinations thereof. The dielectric material may include Li conducting beta-alumina. The silver ion conducting dielectric material may be any of AgI, $Ag_2Te$, $Ag_2Se$, AgSBr, $Ag_3SI$, $RbAg_4I_5$, $KAg_4I_5$, $NH_4Ag_4I_5$, $K_{1-x}Cs_xAg_4I_5$ where $0<x<1$, $Rb_{1-x}Cs_xAg_4I_5$ where $0<x<1$, $CsAg_4ClBr_2I_2$, $CsAg_4Br_{1-x}I_{2+x}$ where $0<x<1$, $Ag_6I_4WO_4$ and mixtures thereof. The sodium ion conducting dielectric material may be of NaCl, $Na_2S$, Na β-alumina, and mixtures thereof. The oxygen ion conducting dielectric is any of $Bi_2(Me_yV_{1-y})O_{6-x}$ where Me any of Cu, Co, Zn, Ge, Ca, Sr, Ni, Fe, Mn, Mg or combinations thereof, $Bi_2(Cu_{0.1}V_{0.9})O_{6-x}$, $(1-x)CaO-xAO_2$ where A is any of Zr, Hf, Th, Ce or combinations thereof, $0.2CaO-0.8ZrO_2$, $0.04Y_2O_3-0.92ZrO_2$, $(1-x)B_2O_3-xZrO_2$ where B is any of La, Sm, Y, Yb, Sc, Ga, or combinations thereof where $0<x<1$.

The invention further relates to a composite material that includes a dielectric material for generating an IBBL effect and an electrochemally active material disposed at grain boundaries of the dielectric material wherein the dielectric material is a ionically conducting dielectric material such as lithium ion conducting dielectric materials, silver ion conducting dielectric materials, sodium ion conducting dielectric materials, oxygen ion conducting dielectric materials and mixtures thereof. The lithium ion conducting material may be $(Li,M)TiO_3$ where M is any of La, Ce, Pr, Nd, and combinations thereof, $LiMO_4$ where M is a transition metal such as selected Co, Mn, Fe, Ni, Cu, Cr, V, or combinations thereof, Li conducting beta-alumina, as well as mixtures of $(Li,M)TiO_3$, $LiMO_4$ and Li conducting beta-alumina. The Ag+ conducting dielectric material is any of AgI, $Ag_2Te$, $Ag_2Se$, AgSBr, $Ag_3SI$, $RbAg_4I_5$, $KAg_4I_5$, $NH_4Ag_4I_5$, $K_{1-x}Cs_xAg_4I_5$ where $0<x<1$, $Rb_{1-x}Cs_xAg_4I_5$ where $0<x<1$; $CsAg_4ClBr_2I_2$, $CsAg_4Br_{1-x}I_{2+x}$ where $0<x<1$, $Ag_6I_4WO_4$ and mixtures thereof, Na+ conducting dielectric material is any of NaCl, $Na_2S$, Na β-alumina, and mixtures thereof, the $O^{2-}$ conducting dielectric material is any of $Bi_2(Me_yV_{1-y})O_{6-x}$ where Me is any of Cu, Co, Zn, Ge, Ca, Sr, Ni, Fe, Mn, Mg or combinations thereof, $Bi_2(Cu_{0.1}V_{0.9})O_{6-x}$, $(1-x)CaO-xAO_2$ where A is any of Zr, Hf, Th, Ce or combinations thereof where $0<x<1$, $0.2CaO-0.8ZrO_2$, $0.04Y_2O_3-0.92ZrO_2$, $(1-x)B_2O_3-xZrO_2$ where B is any of La, Sm, Y, Yb, Sc, Ga, or combinations thereof where $0<x<1$. The electrochemally active material is any of $Al(OH)_3$, $Mg(OH)_2$, $Ca(OH)_2$, $Sr(OH)_2$, $Ba(OH)_2$, $Ni(OH)_2$, $Co(OH)_2$, $Li_2O$, $Na_2O$, $K_2O$, layered double hydroxides of the formula $[M^{2+}_{1-x}M^{3+}_x(OH)_2]^{x+}[A^{z-}_{x/z}.nH_2O]^{x-}$ where $0.1 \leq x \leq 0.5$, $1<z<3$, and $2 \leq n \leq 4$, $M^{2+}$ is Mg, Ni, Zn, Co, Fe, Ca, Mn and combinations thereof, $M^{3+}$ is any of Al, Fe, Cr, Mn and combinations thereof, A is any of $CO_3^{2-}$, $SO_4^{2-}$, $OH^-$, $Cl^-$ and combinations thereof, and layered double hydroxides of the formula $[M^+_{1-x}M^{3+}_x(OH)_2]^{(2x-1)+}[A^{z-}_{(2x-1)/z}.nH_2O]^{x-}$, where A is any of $CO_3^{2-}$, $SO_4^{2-}$, $OH^-$, $Cl^-$ and combinations thereof, $2 \leq n \leq 4$, $0.2 \leq x \leq 0.4$; $1<z<3$, $M^+$ is any of Li, Na, K, Ag, and combinations thereof, and $M^{3+}$ is Al, Fe, Cr, Mn and combinations thereof.

The invention also relates to a composite material that includes a protonated dielectric for generating a PBBL effect and an electrochemically active material disposed at grain boundaries of the protonated dielectric wherein the electrochemally active material is any of layered double hydroxides of the formula $[M^{2+}_{1-x}M^{3+}_x(OH)_2]^{x+}[A^{z-}_{x/z}.nH_2O]^{x-}$ where $0.1 \leq x \leq 0.5$, $1<z<3$, $M^{2+}$ is any of Mg, Ni, Zn, Co, Fe, Ca, Mn and combinations thereof, $M^{3+}$ is any of Al, Fe, Cr, Mn and combinations thereof, A is any of $CO_3^{2-}$, $SO_4^{2-}$, $OH^-$, $Cl^-$ and combinations thereof and $2 \leq n \leq 4$, and layered double hydroxides of the formula $[M^+_{1-x}M^{3+}_x(OH)_2]^{(2x-1)+}[A^{z-}_{(2x-1)/z}.nH_2O]^{x-}$ where A is any of $CO_3^{2-}$, $SO_4^{2-}$, $OH^-$, $Cl^-$ and combinations thereof, $2 \leq n \leq 4$, $0.2 \leq x \leq 0.4$, $1<z<3$, $M^+$ is any of Li, Na, K, Ag, and combinations thereof, and $M^{3+}$ is any of Al, Fe, Cr, Mn and combinations thereof. The protonated dielectric is any of doped perovskites, undoped perovskites, doped tungsten bronzes, undoped tungsten bronzes, doped pyrochlores, undoped pyrochlores, layered perovskites, and oxides that have permittivities of about 50 or more. The perovskites are within the formula $[(M')_{1-x}(A')_x]$ $(M'')_{1-y-z}(B'')_y(C'')_z]O_{3-\delta+h}(V_o)_\delta(H^*)_{2h}$ where $H^*$ is a proton incorporated at an oxygen site and $0.00 < h \leq \delta \leq 0.5x+0.5y+z$ where $0.0 \leq x \leq 0.4$, $0.00 \leq b \leq 0.99$, $0.00 \leq y \leq 0.40$, $0.00 \leq z \leq 0.40$, M' is any of Ba, Mg, Ca, Sr, Pb and mixtures thereof, A' is any of K, Na, Li, Ag and mixtures thereof, M'' is any of Ti, Zr, Hf, Ce, Sn, $(Mg_{1/3},Nb_{2/3})$, $(Zn_{1/3},Nb_{2/3})$, $(Sc_{1/2},Ta_{1/2})$ and mixtures thereof, B'' is any of Sc, Al, Y, La, Fe, Yb, Ho, Tm, Sb, Sm, Nd, Gd, Er, Pr, Mo, Dy and mixtures thereof, C'' is any of V, Mn, Cr, Fe, Ni, Cu, Zn, Ca, Mg and mixtures thereof, and $(VO)_\delta$ represents oxygen vacancies.

The invention further relates to an energy storage device that employs a dielectric material disclosed herein such as capacitors and batteries. Where the storage device is a capacitor, the capacitor includes a dielectric material for generating an IBBL effect and metal electrode that employ metals such Cu, Al, Au, Ag, Ni, Co, Fe, Cr, Pt, Pd, alloys thereof and mixtures thereof. At least one metal electrode is electrochemically active with an ionic species in the dielectric material to enable generation of pseudocapacitance.

The invention also relates to an energy generation device that includes a dielectric material such as any of those disclosed herein. The device may be a fuel cell.

DETAILED DESCRIPTION OF THE INVENTION

Ceramic Dielectric Materials that May be Used in Manufacture of Ionically Conducting Dielectrics Materials for use in manufacture of ionically conducting dielectric materials that may show an IBBL effect include but are not limited to proton conducting dielectric materials, lithium ion conducting dielectric materials, silver ion conducting dielectric materials, sodium ion conducting dielectric materials, and oxygen ion conducting dielectric materials and mixtures thereof. Lithium ion conducting dielectric materials may include but are not limited to lanthanoid doped $LiTiO_3$ of the formula $(Li,M)TiO_3$ where M is any of La, Ce, Pr, Nd, and combinations thereof. Li transition metal oxides of the formula $LiMO_4$ where M is a transition metal such as Co, Mn, Fe, Ni, Cu, Cr, V, or combinations thereof; and Li conducting beta-alumina. Silver ion conducting dielectric materials that may be employed include but are not limited to halides and chalgogenides such as AgI, $Ag_2Te$, $Ag_2Se$, AgSBr, $Ag_3SI$, rubidium silver iodide type compounds such as $RbAg_4I_5$, $KAg_4I_5$, $NH_4Ag_4I_5$, $K_{1-x}Cs_xAg_4I_5$ where $0<x<1$, $Rb_{1-x}Cs_xAg_4I_5$ where $0<x<1$; $CsAg_4ClBr_2I_2$, $CsAg_4Br_{1-x}I_{2+x}$ where $0<x<1$, silver iodide tungstate $Ag_6I_4WO_4$ and mixtures thereof. Sodium ion conducting dielectric materials that may be employed include but are not limited to halides and chalgogenides such as NaCl, $Na_2S$, the beta aluminas Na β-Alumina, and mixtures thereof. Oxygen ion conducting dielectric materials that may be employed include but are not limited to those of the BiMeVOX family with the general formula $Bi_2(Me_yV_{1-y})O_{6-x}$ where Me is a metal cation such as Cu, Co, Zn, Ge, Ca, Sr, Ni, Fe, Mn, Mg or combinations thereof and $0<y<0.5$ such as $Bi_2(Cu_{0.1}V_{0.9})O_{6-x}$, defect stabilized fluorites such as $(1-x)CaO-xAO_2$ where A is Zr, Hf, Th, Ce or combinations thereof and $0<x<1$ such as $0.2CaO-0.8ZrO_2$, and also doped zirconias of the formula $(1-x)B_2O_3-xZrO_2$ where B is La, Sm, Y, Yb, Sc, Ga, or combinations thereof and $0<x<1$ such as $0.04Y_2O_3-0.92ZrO_2$.

Ceramic Dielectric Materials that may be used in Manufacture of $H^+$ Conducting Dielectrics Sintered ceramic dielectrics such as acceptor doped ceramic dielectric materials may be used in manufacture of protonated dielectric materials that show a PBBL effect. The sintered ceramic dielectric materials, such as when employed independently of electrochemically active grain boundary materials, may function as a capacitor and may achieve energy densities of up to about 100 J/cc or more. Acceptor doped ceramic dielectric materials that may employed in manufacture of dielectric materials that show a PBBL effect include but are not limited to those that have any of perovskite structures, tungsten bronze structures, pyrochlore structures, perovskite layered structures and mixtures thereof.

Examples of ceramic materials that have perovskite structures that may be employed include but are not limited to $BaTiO_3$, doped $BaTiO_3$, $BaZrO_3$, doped $BaZrO_3$, $PbTiO_3$, doped $PbTiO_3$, $PbZrO_3$, doped $PbZrO_3$, $SrTiO_3$, doped $SrTiO_3$, $SrZrO_3$, doped $SrZrO_3$, $CaZrO_3$, doped $CaZrO_3$, $BiScO_3$, doped $BiScO_3$ and mixtures thereof.

Examples of ceramic materials that have tungsten bronze structures that may be employed include but are not limited to $(Sr_xBa_{1-x})Nb_2O_6$ where $0<x<1$, $(Sr_xBa_{1-x})Ta_2O_6$ where $0<x<1$, $PbNb_2O_6$, $PbTa_2O_6$, $LiBa_2Nb_5O_{15}$, $Ba_2Na_3YNb_{10}O_{30}$, $Na_3Ba_3W_3Nb_9O_{30}$ and mixtures thereof.

Examples of ceramic materials that have pyrochlore structures that may be employed include but are not limited to $La_2Zr_2O_7$, $Bi_2(Zn_{1/3}Nb_{2/3})_2O_7$, $Cd_2Nb_2O_7$, $Bi_2(Zn_{4/3}Ta_{2/3})O_6$ and mixtures thereof.

Examples of ceramic materials that have perovskite layered structures that may be employed include but are not limited to $Bi_4Ti_3O_{12}$, $Sr_2Bi_4Ti_5O_{18}$; $Bi_2SrTa_2O_9$, $Bi_2Cu_{0.1}Ti_{0.9}O_{6-x}$ where $x\sim5.35$ and mixtures thereof.

Where doped perovskite materials are employed for use as dielectric materials that may show a PBBL effect, protonated perovskite materials may include protonated $Ba(Zr_{0.8}Y_{0.2})O_3$, protonated $Ba((Zr_{0.15}Ti_{0.85})_{0.9}Sc_{0.1})O_3$, and mixtures thereof.

Where doped perovskite is employed for use in manufacture of a protonated perovskite, the doped perovskite has the general formula (I) $[(M')_{1-x}(A')_x][(M'')_{1-y-z}(B'')_y(C'')_z]O_{3-\delta}(V_O)_\delta$ (I) where $0.0 \leq x \leq 0.4$, $0.00 \leq b \leq 0.99$, $0.00 \leq y \leq 0.40$, $0.00 \leq z \leq 0.40$, M' is Ba, Mg, Ca, Sr, Pb and mixtures thereof; A' is K, Na, Li, Ag and mixtures thereof; M'' is Ti, Zr, Hf, Ce, Sn, $(Mg_{1/3},Nb_{2/3})$, $(Zn_{1/3},Nb_{2/3})$, $(Sc_{1/2},Ta_{1/2})$ and mixtures thereof; B'' is Sc, Al, Y, La, Fe, Yb, Ho, Tm, Sb, Sm, Nd, Gd, Er, Pr, Mo, Dy and mixtures thereof and C'' is V, Mn, Cr, Fe, Ni, Cu, Zn, Ca, Mg and mixtures thereof. The amount of oxygen vacancies $(VO)_\delta$ in the doped dielectric is such that $\delta \leq 0.5x + 0.5y + z$. Doped dielectrics of formula (I), after protonation, have the general formula (IA) $[(M')_{1-x}(A')_x](M'')_{1-y-z}(B'')_y(C'')_z]O_{3-\delta+h}(V_o)_\delta(H^\cdot)_{2h}$ where the symbols have the same meaning as in formula (I), H* is a proton incorporated at an oxygen site and $0.00 < h \leq \delta \leq 0.5x + 0.5y + z$, $0.0 \leq x \leq 0.4$, $0.00 \leq b \leq 0.99$, $0.00 \leq y \leq 0.40$, $0.00 \leq z \leq 0.40$.

IBBL Effect

An IBBL effect such as PBBL effect may be generated by transport of ions such as protons under an electric field to accumulate at resistive grain boundaries to yield an effective capacitance shown schematically in FIG. 1. The relaxation process shown in FIG. 1 relates to accumulation of protons at grain boundaries by proton transport under bias. In contrast, effective capacitance in a polycrystalline ceramic that utilizes electrons and holes as the primary charge carriers is typically manifested by higher frequency relaxations of about $10^5$ Hz in $BaTiO_3$ based materials and about $10^6$ Hz in $SrTiO_3$ based material. An IBBL effect such as PBBL effect may be measured by known techniques such as impedance spectroscopy, cyclic voltammetry, galvanostatic charge/discharge, polarization-field (charging and discharging), leakage current measurements, and dielectric breakdown strength at temperature over a range of about −50° C. to about 65° C.

The energy storage potential of energy storage devices that employ ionically conducting materials that may show an IBBL effect such as a PBBL effect may be controlled by varying the grain composition, grain boundary morphology and grain size of the dielectric grains. The grain composition may be controlled by varying the concentration of acceptor dopants, and/or by incorporating one or more minority dopants such as electron acceptor species such as but not limited to Mn, Cr, Fe, Ni, and donor species such as but not limited to Nb, La, Y, Dy, and Nd.

Where the ionically conducting material is a Li+ type conducting material such as any one or more of $(Li,La)TiO_3$, $LiCoO_4$ and $LiMn_2O_4$, the grain composition may be controlled by varying the concentration of acceptor dopants such as electron acceptor species such as but not limited to Sc, Cr, Mn, Fe, Ca, Ni, Cu, Zn, on B-site and donor species such as but not limited to Mg, Ca, Sr, on A-site or Nb, Ta, Mo, W, Re, Sb, on B-site.

Where the ionically conducting material is a Ag+ conducting material rubidium silver iodide type compound type material, the grain composition may be controlled by varying the concentration of acceptor dopants such as electron acceptor species such as but not limited to O, Se, S, Te and combinations thereof, in substitution for I, and donor species such as but not limited to Be, Mg, Ca, Sr, Ba, Sc, in place of Ag or Rb and combinations thereof.

Where the ionically conducting material is a Na+ type material such as $Na_2S$, the grain composition may be controlled by varying the concentration of acceptor dopants such as electron acceptor species such as but not limited to N, P, As, Sb, C, Si and combinations thereof and donor species such as but not limited to Be, Mg, Ca Sr, and combinations thereof;

Where the ionically conducting material is a $O^{-2}$ type material, such as $Bi_2(Cu_{0.1}V_{0.9})O_{5.35}$, the grain composition may be controlled by varying the concentration of acceptor dopants such as electron acceptor species such as but not limited to Mn, Ni, Zn, Sc, Ti, V, Cr, La, Nd, Dy, Ho and combinations thereof and donor species such as but not limited to Nb, Ta, W, Mo, and combinations thereof.

Grain boundary morphology may be varied by incorporating dopants that, in addition to modifying bulk grain properties, modify grain boundary defect states so as to modify transport properties across grain-grain interfaces. Examples of these dopants include but are not limited to oxides, carbonates, sulphates, nitrates, and hydroxides of Bi, Pb, Zn, Si, B, Nb, Ta, W, Li, Ca, Mg, Cr, Ni, Mn, Al, P, and combinations thereof.

Grain size may be varied to control transport properties across protonated grain-grain. Grain size may be increased by use of higher sintering temperatures and longer sintering times. Sintering aids such as ZnO in an amount of about 1% mol to about 8% mol may be added to the ceramic powder during a post calcination milling stage to lower the sintering temperature by about 100° C. to about 200° C. to encourage grain growth at lower temperatures.

Manufacture of IBBL Materials that Employ Electrochemically Active Grain Boundary Materials Dielectrics that may show a an IBBL effect such as a PBBL effect may be mixed with one or more electrochemically active grain boundary materials such as electrochemically active grain boundary compounds or electrochemically active grain boundary compositions or may be coated with one or more electrochemically active grain boundary materials. The ionically conducting dielectrics such as protonated dielectrics may be present in an amount of about 1% to about 99.999% of the mixture, remainder electrochemically active grain boundary material.

Where ionically conducting dielectrics such as protonated dielectrics are coated with one or more electrochemically active grain boundary compounds or compositions, the ionically conducting dielectrics such as proton conducting dielectrics may be coated by immersing the dielectric in a metal salt precursor solution and then drying the solution to precipitate salt onto the dielectric. The resulting salt-coated dielectric then is exposed to a hydroxide solution to convert the metal salt to a layered double hydroxide. The thickness of the coatings may be about 0.1 nm to about 500 nm, preferably about 1 nm to about 150 nm, more preferably about 50 nm to about 150 nm.

Co-precipitation of layered double hydroxide onto surfaces of dielectric may be performed in a supersaturated solution of $M^{2+}$ and $M^{3+}$. Super saturation may be achieved by pH control and the reaction vessel may be heated up to about 100 C and/or super saturation may be achieved in hydrothermal conditions of high temperature and pressure. Ammonia-based hydrolysis reactions such as thermal decomposition of urea may be used to control precipitation by pH control to enable uniform coating of layered double hydroxide onto a dielectric. Hydrolysis and pH may be controlled by heating a solution that includes an appropriate ratio of metal salt precursors to between 80-100 C so that the urea decomposes releasing ammonia and increasing the pH thereby causing precipitation of the metal hydroxide.

Electrochemical Charge Transfer Reactions

Figure 6:
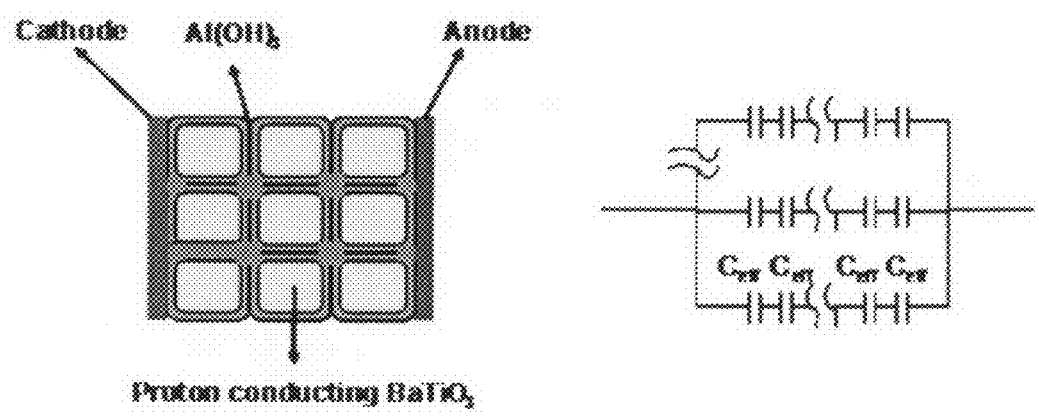
FIG. 6 is a schematic of the functionality of electrochemical mechanisms in dielectrics that may show a PBBL effect with the additional presence of an electrochemically active grain boundary material such as $Al(OH)_3$.

Reactions in the form of charge transfer reactions between electrochemically active materials and protonated dielectrics may generate pseudocapacitance. The functionality of electrochemical mechanisms in the context of a dielectric that shows a PBBL effect with an $Al(OH)_3$ grain boundary phase is shown schematically in FIG. 2C and FIG. 6.

Electrochemically active grain boundary compounds employed with ionically conducting dielectric materials that may show an IBBL effect such as PBBL effect, may form hydrides, hydroxides, oxyhydroxides or mixtures thereof at grain boundaries and may yield pseudo capacitance at the grain boundaries. Examples of electrochemically active grain boundary materials such as electrochemally active grain boundary compounds that may be employed include but are not limited to hydroxides such as $Al(OH)_3$, $Mg(OH)_2$, $Ca(OH)_2$, $Sr(OH)_2$, $Ba(OH)_2$ $Ni(OH)_2$, $Co(OH)_2$ and mixtures thereof, alkali oxides such as $Li_2O$, $Na_2O$, $K_2O$ and mixtures thereof as well as mixtures of hydroxides and alkali oxides. Other electrochemically active grain boundary compounds that may be employed include layered double hydroxides that have a hydrotalcite-like structure and have the formula $[M^{2+}_{1-x}M^{3+}_x(OH)_2]^{x+}[A^{z-}_{x/z} \cdot nH_2O]^{x-}$ where $0.1 \le x \le 0.5$; $1 < z < 3$; $M^{2+}$ is Mg, Ni, Zn, Co, Fe, Ca, Mn and combinations thereof; $M^{3+}$ is Al, Fe, Cr, Mn and combinations thereof; A is $CO_3^{2-}$, $SO_4^{2-}$, $OH^-$, $Cl^-$ and combinations thereof, and $2 \le n \le 4$. Layered double hydroxides also may be of formula $[M^+_{1-x}M^{3+}_x(OH)_2]^{(2x-1)+}[A^{z-}_{(2x-1)/z} \cdot nH_2O]^{x-}$, where A is an anion such as $CO_3^{2-}$, $SO_4^{2-}$, $OH^-$, $Cl^-$ and combinations thereof, $2 \le n \le 4$, $0.2 \le x \le 0.4$; $1 < z < 3$ where $M^+$ includes Li, Na, K, Ag, and combinations thereof, $M^{3+}$ is Al, Fe, Cr, Mn and combinations thereof. Preferably, the layered double hydroxide is $LiAl_2(OH)_7 \cdot nH_2O$.

Manufacture of Ionically Conducting Dielectrics that May Show a IBBL Effect

Li conducting ionic materials such as $(Li,La)TiO_3$ that may show an IBBL effect may be made by a conventional mixed oxide route. Starting chemical compound powders may include $Li_2CO_3$, $La_2O_3$, and $TiO_2$. These powders are mixed by ball milling in ethanol in the appropriate molar ratio e.g. Li:La:Ti::0.33:0.57:1, for example. The dried powders are then calcined at 1150° C. for 10 hrs, reground by ball-milling, pressed into pellets, and sintered at 1300° C. for 4 hrs.

Ag conducting ionic materials such as $RbAg_4I_5$ that may show an IBBL effect may be made by melting stoichiometric amounts of AgI and RbI in a platinum crucible followed by rapid quenching to room temperature. The solidified melt is then ground into powder. The Powder can be cold pressed in a steel die at a pressure of about 100,000 PSI for about 20 hours to form dense pellets.

Na conducting ionic materials such as Na-beta Alumina that may show an IBBL effect may be made by a conventional solid state reaction method by mixing $NaCO_3$ with $Al_2O_3$ and calcining the powders at high temperature such as about 1600° C., followed by ball milling to reduce particle size. Powders can then be formed in to pellets and sintered;

$O_2$ conducting ionic materials that such as $Bi_2(Cu_{0.1}V_{0.9})O_{6-x}$ where $0 < x < 0.65$ that may show an IBBL effect may be made by a conventional solid state reaction method. Stoichiometric quantities of the starting materials $Bi_2O_3$, CuO, $V_2O_5$ are mixed by ball milling in ethanol. The dried powders are calcined at about 800° C. for about 10 hrs in alumina crucibles. The calcined powder is remilled in ethanol to break up agglomerates and again dried. The dried calcined powder is pressed into pellets and sintered at about 800° C. to about 1100° C. for about 4 hrs for form dense sintered bodies.

Manufacture of Ionically Conducting Dielectrics that May Show a PBBL Effect

Ionically conducting dielectric materials that may show a PBBL effect may be fabricated by protonating doped or undoped dielectrics such as doped or undoped perovskites, doped or undoped tungsten bronzes, doped or undoped pyrochlores, layered perovskites and oxides that have permittivities of about 50 or more, preferably doped or undoped perovskites of the formula $ABO_3$ such as barium titanate, undoped barium titanate and mixtures thereof.

Where doped $ABO_3$ perovskite type dielectric oxides are employed, the oxides may be doped with one or more electron acceptor dopants to create vacancies on the oxygen sublattice to compensate for additional negative charge of the electron acceptor dopants. Preferably, one oxygen vacancy is created for each $2^+$ valence electron dopant acceptor species on the B-site, one oxygen vacancy is created for every two $1^+$ valence electron acceptor dopants on the A-site, and one oxygen vacancy is created for every two $3^+$ valence electron acceptor dopants on the B-site. Electron acceptor dopant concentration may be up to about 50% of the total B-site and may be up to about 50% on the total A-site. A-site cations that have a valence of 1+ for use in $ABO_3$ perovskites may include but are not limited to K, Na, Li, Ag and combinations thereof.

A-site cations in $ABO_3$ perovskites may include cations of valence $2^+$ such as Ba, Mg, Ca, Sr, Pb, Cd, and combinations thereof. B-site cations that have a valence of 2+ include but are not limited to V, Cr, Mn, Fe, Ni, Cu, Zn, Ca, Mg and combinations thereof. B-site cations that have a valence of 3+ in $ABO_3$ perovskites include but are not limited to Sc, Al, Y, La, Yb, Ho, Tm, Sb, Sm, Nd, Gd, Er, Pr, Mo, Dy and combinations thereof. B-site cations in $ABO_3$ perovskites may include cations of valence 4+ such as but not limited to Ti, Zr, Hf, Sn, Ce, Th, Mn, Ir as well as multi-cation species whose average valence is $4^+$. Examples of multi-cation species that may be employed include but are not limited to $(Mg_{1/3}, Nb_{2/3})$, $(Zn_{1/3}, Nb_{2/3})$, $(Sc_{1/2}, Ta_{1/2})$, $(Mg_{1/2}, W_{1/2})$ and combinations thereof.

Where the perovskite of formula $ABO_3$ is $BaTiO_3$, examples of $1^+$ valence electron acceptor A' dopants that may be substituted on the A-site include are not limited to K, Na, Li, Ag and combinations thereof; examples of $3^+$ valence electron acceptor B" dopants that may be substituted on the B-site include but are not are not limited to Sc, Al, Y, La, Fe, Yb, Ho, Tm, Sb, Sm, Nd, Gd, Er, Pr, Mo, and Dy and combinations thereof; examples of 2+ valence electron acceptor dopants that may be substituted on the B-site include but not limited to V, Cr, Mn, Fe, Ni, Cu, Zn, Ca, Mg and combinations thereof.

The dielectric such as dielectric oxide such as a perovskite oxide such as doped barium titanate or undoped barium titanate may be protonated by subjecting the dielectric to water vapor heat treatment such as steam at about 300° C. to about 900° C. at about 0.1 PSI to about 100 PSI for about 10 hrs to about 24 hrs. The dielectric may be protonated to about 0.1% to about 40%, preferably about 0.5% to about 20%, more preferably about 1% to about 15%, where all amounts are in terms of molar percentages. The extent of protonation may be measured by techniques such as mass gain, conductivity change, and infrared spectroscopy. Where the A-site in $ABO_3$ perovskite is doped, the protonated, doped dielectric has the formula $(A_{1-x}A'_xBO_{3-x})(H^\bullet)_x$ where $0.0<x<0.5$ and where A' and H* are as defined in formula IA. Where the B-site in $ABO_3$ perovskite is doped, the protonated, doped dielectric has the formula $A(B_{1-y-z}B''_yC''_z)O_{3-y-2z}(H^\bullet)_{y+2z}$ where $0.00<y<0.40, 0.00<z<0.40$ and where A, B, B", C" and H* are defined as in formula IA. Where both the A-site and the B-site in $ABO_3$ dielectric are each doped, the protonated, doped dielectric has the formula $(A_{1-x}A'_x)(B_{1-y-z}B''_yC''_z)O_3(H^\bullet)_{x+y+2z}$ where $0.0<x<0.4$, $0.0<y<0.4$ and $0.0<z<0.4$, and where A, A', B, B" and C" are defined as in formula IA. Manufacture of Protonated Dielectrics that may Show a PBBL Effect of Formula (IA) $[(M')_{1-x}(A')_x](M'')_{1-y-z}(B'')_y(C'')_z]O_{3-\delta+h}(V_o)_\delta(H^\bullet)_{2h}$ Dielectric compounds such as doped $ABO_3$ perovskites such as any one or more of doped $BaTiO_3$, doped $BaZrO_3$, doped $PbTiO_3$, doped $PbZrO_3$, doped $SrTiO_3$, doped $SrZrO_3$, doped $CaZrO_3$, and doped $BiScO_3$ for use in manufacture of dielectric materials that may show a PBBL effect may be prepared by ball milling starting materials such as $BaCO_3$, $TiO_2$ and $Sc_2O_3$ in a liquid such as a lower alkanol such as ethanol or water-ammonia solutions or combinations thereof to form a slurry. Typically, the starting materials are about 99.9% purity or greater and the liquid is at a pH of about 7 to about 14. Starting materials such as oxide starting materials of 99.9% purity or greater are available from Sigma-Aldrich. The slurry is dried and then calcined at about 800° C. to about 1400° C., preferably about 1000° C. to about 1300° C., more preferably about 1250° C. to form perovskite phase barium titanate and/or doped barium titanate compounds.

The perovskite phase compounds then are ball-milled to produce a milled powder having a particle size of about 0.1 micron to about 10 micron, preferably about 0.1 micron to about 5 micron, more preferably about 0.1 micron to about 1 micron. The milled powder is pelletized such as by uniaxial pressing to produce a preform that may be further compressed such as by iso-static pressing. The preform is sintered in air at about 1000° C. to about 1500° C., preferably about 1050° C. to about 1500° C., more preferably about 1250° C. to about 1500° C. for about 1 hr to about 20 hrs, preferably about 2 hrs to about 10 hrs, more preferably about 2 hrs to about 6 hrs.

Alternatively, doped $ABO_3$ perovskites such as doped barium titanate may be prepared by chemical methods such as by precipitation from solution. During synthesis of doped $ABO_3$ perovskites such as any one or more of doped barium titanate, doped $BaZrO_3$, doped $PbTiO_3$, doped $PbZrO_3$, doped $SrTiO_3$, doped $SrZrO_3$, doped $CaZrO_3$, and doped $BiScO_3$ the B-site precursor solution is mixed with the A-site precursor solution to form a precipitate. One or both of the A-site and B-site precursor solutions may be heated from about 20° C. to about 100° C. prior to mixing. A first one of the precursor solutions, hereinafter referred to as B-site precursor solution, may include liquids that include perovskite B-site species such as but not limited to Ti, Zr, Hf and Sn and combinations thereof. The B-site precursor solutions may include organometallics of B-site species such as in the form of but not limited to methoxides, ethoxides, propoxides, butoxides and mixtures thereof. The organometallics of B-site species are dissolved in an organic solvent such as but not limited to ethanol, iso-propanol or mixtures thereof. The concentration of B-site species in the B-site precursor solutions may vary from about 0.1M to about 5M, preferably about 0.1M to about 2M, more preferably about 0.1M to about 0.5M.

The second one of the precursor solutions, hereinafter referred to as A-site precursor solution, includes an aqueous alkaline solution of one or more salts that includes A-site species. These salts may include but are not limited to $Ba(OH)_2$, $Sr(OH)_2$ $Mg(OH)_2$, $Pb(OH)_2$ or mixtures thereof. The concentration of A-site species in the A-site precursor solution may vary from about 0.1M to about 5M, preferably about 0.1M to about 2M, more preferably about 0.1M to about 0.5M.

The pH of the A-site precursor solution may be adjusted to about 8 to about 14, preferably about 10 to about 13, more preferably about 11 to about 12 by addition of a strong base such as but not limited to NaOH, $NH_4OH$ or $(CH_3)_4NOH$ or mixtures thereof.

Mixing of the A-site and B-site precursor solutions may be conducted rapidly by pouring one solution into the other or slowly by adding one solution to the other in a dropwise fashion to form a precipitate. The precipitate may be treated by refluxing at about 80° C. to about 100° C., preferably about 85° C. to about 99° C., more preferably about 90° C. to about 95° C. for about 0.5 hrs to about 48 hrs, preferably about 1 hr to about 24 hrs, more preferably about 5 hrs to about 20 hrs. Alternatively, the precipitate may be treated in an autoclave or hydrothermal treatment in an oven at about 100° C. to about 300° C., preferably about 150° C. to about 250° C., more preferably about 180° C. to about 240° C. at about 20 PSI to about 500 PSI, preferably about 100 PSI to about 400 PSI, more preferably about 200 PSI to about 300 PSI to produce a powder having a particle size greater than that of the precipitate and a crystallinity greater than that of the precipitate. The powder may be washed in deionized water and removed from solution by filtration or centrifuging. The powder then may be dried at about 50° C. to about 200° C., preferably about 80° C. to about 150° C., more preferably about 100° C. to about 120° C. to produce dried powder. The dried powder may be further processed into sintered bodies by the calcination-sintering procedure described above.

The sintered $ABO_3$ compounds such as sintered $BaTiO_3$ and sintered doped $BaTiO_3$ then are protonated. During protonation, the sintered $ABO_3$ compounds such as doped sintered barium titanate are exposed to flowing steam such as in a tube furnace at about 20° C. to about 900° C., preferably about 300° C. to about 900° C., more preferably about 500° C. to about 700° C. at about 0.1 PSI to about 100 PSI, preferably about 1 PSI for about 50 PSI, more preferably about 2 PSI to about 20 PSI for about 1 hr to about 24 hrs, preferably about 2 hrs to about 15 hrs, more preferably about 5 hrs to about 10 hrs.

Manufacture of Energy Storage and Generation Devices

Energy storage devices that employ ionically conducting dielectric materials such as those disclosed may be employed in vehicles such as electric vehicles, hybrid electric vehicles such as hybrid electric automobiles. Other applications include but are not limited to actuators, electronic devices such as computers, electronic flash units, video cameras and the like. These dielectrics and the devices in which they are employed may have special utility in military and aerospace applications as well as in down-hole oil and gas exploration technology.

Multilayer Capacitors

Multilayer capacitors that employ dielectrics that show an IBBL effect such as PBBL effect may be made by known methods such as tape casting and thick film screen-printing techniques of layers employed in manufacture of components. Electrical connections that may be deposited by use of metal pastes such as those that include Al, Ni, Cu, Fe, Pt, Pd, Ag, Au, and alloys thereof on to the layers of deposited dielectric may be made at the edges of each layer in a manner similar to that employed in conventional multilayer capacitor or piezoelectric actuator structures. Electrode connections by interconnect may also be used. Tape casting or screen-printing may be employed to produce single layers of protonated dielectrics that show a PBBL effect. The single layers may have a thickness of up to about 100 microns and surface areas of about 25 mm$^2$ to about 4 cm$^2$ or more for use as dielectric layers in a multilayer capacitor. The single layers then are heat-treated to cause densification. The single layers, after heat treatment, may be reprotonated with steam treatment and may be able to achieve capacitances on the order of millifarads at voltages of about 500V to about 800V across a 10 micron to about a 20-micron layer.

As used herein, the term "thick-film" is understood to mean a film that has a minimum single layer thickness of about 0.5 microns and a maximum single layer thickness of about 500 microns.

Composite Compositions that Employ Ionically Conducting Dielectrics

Dielectrics that show an IBBL effect such as a PBBL effect may be employed with ionomeric electrolytes, solid-state protonic electrolytes and mixtures thereof to provide composite material compositions to enable reversible reactions between the dielectric and any one or more of the ionomeric and protonic electrolyte. Those composite materials may be used in rechargeable energy storage devices such as batteries, capacitors, cameras, flash disks, portable power tools, laptops, portable video equipment, and military hardware. Examples of ionomeric electrolytes that may be employed include but not limited to tetrafluoroethylene-perfluoro-3,6-dioxa-4-methyl-7-octenesulfonic acid copolymer ("Nafion"), poly(ethylene-co-methacrylic acid, polyethylene oxide, polyvinylidene fluoride, and mixtures thereof. Solid-state ionomeric electrolytes that may be employed include but not limited to layered double hydroxides such as those described above, ion-conducting glass, conductive ceramics and mixtures thereof.

The composite compositions may be made by mixing one or more of the above electrolytes with one or more ionically conducting dielectrics that show an IBBL effect such as a PBBL effect. The electrolytes may be present in the composite compositions in an amount of about 0.1% to about 99.99%, preferably about 1% to about 50%, more preferably about 5% to about 35% remainder dielectric, where all amounts are based on the total volume of the composite composition.

The invention is described in further detail below by reference to the following, non-limiting examples.

Examples 1A-1D and 2 illustrate manufacture of protonated doped barium titanate compounds

Example 1A

Manufacture of Protonated $Ba(Sc_{0.1}Ti_{0.9})O_3$ 197.3 gms of $BaCO_3$, 71.88 gms $TiO_2$ and 6.896 gms $Sc_2O_3$ starting materials, where the starting materials have a purity of 99.9% or more from Sigma-Aldrich, are ball milled in a Teflon lined ball mill with yttria-stabilized-zirconia balls in ethanol for 24 hrs to form a slurry.

The slurry is dried at 80° C. for 24 hrs to produce a dried powder. The dried powder is successively calcined at 1050° C. for 10 hrs, at 1150° C. for 10 hrs, at 1250° C. for 10 hrs, at 1400° C. for 10 hrs, and then at 1500° C. for 10 hrs to form $Ba(Sc_{0.1}Ti_{0.9})O_{2.95}(V_O)_{0.05}$ where $V_O$ is oxygen site vacancy. The $Ba(Sc_{0.1}Ti_{0.9})O_{2.95}(V_O)_{0.05}$ is ball-milled in ethanol for 24 hrs with yttria-stabilized zirconia balls to form a slurry of milled powder that has a particle size of 1 micron or less. The milled powder is dried at 80° C. and then uniaxially pressed at 15,000 PSI to produce a preform. The preform then is isostatically compressed at 30,000 PSI. The resulting preform is sintered at 1550° C. for 10 hrs to produce sintered $Ba(Sc_{0.1}Ti_{0.9})O_{2.95}(V_O)_{0.05}$ The sintered $Ba(Sc_{0.1}Ti_{0.9})O_{2.95}(V_O)_{0.05}$ is polished to form a thin disk and exposed to steam flowing at 0.005 CFM in a tube furnace at 560 PSI for 2 hrs followed by a slow cool from 900° C. to 100° C. at a rate of 0.5° C./min.

Example 1AT

Manufacture of $Ba(Sc_{0.1}Ti_{0.9})O_{2.9575}(V_O)_{0.0425}(H^*)_{0.015}$

The sintered $Ba(Sc_{0.1}Ti_{0.9})O_{2.95}(V_O)_{0.05}$ of example 1A is exposed to steam flowing at 0.001 CFM in a tube furnace at 560 PSI during cooling from 900° C. to 200° C. at a rate of 0.5° C./min.

Example 1AU

Manufacture of $Ba(Sc_{0.1}Ti_{0.9})O_{2.955}(V_O)_{0.045}(H^*)_{0.010}$

The sintered $Ba(Sc_{0.1}Ti_{0.9})O_{2.95}(V_O)_{0.05}$ disk of example 1A is exposed to steam flowing at 0.001 CFM in a tube furnace at 560 PSI during cooling from 900° C. to 300° C. at a rate of 0.5° C./min.

Example 1B

Manufacture of Protonated $Ba(Sc_{0.4}Ti_{0.6})O_3$

The procedure of example 1A is followed except that 197.3 gms $BaCO_3$, 47.92 gms $TiO_2$ and 27.584 gms of $Sc_2O_3$ are employed.

Example 1BT

Manufacture of $Ba(Sc_{0.4}Ti_{0.6})O_{2.83}(V_O)_{0.17}(H^*)_{0.06}$

The sintered disk produced as in example 1B is exposed to steam flowing at 0.001 CFM in a tube furnace at 560 PSI during cooling from 900° C. to 200° C. at a rate of 0.5° C./min.

Example 1BU

Manufacture of $Ba(Sc_{0.4}Ti_{0.6})O_{2.82}(V_o)_{0.18}(H^*)_{0.04}$

The sintered disk produced as in example 1B is exposed to steam flowing at 0.001 CFM in a tube furnace at 560 PSI during cooling from 900° C. to 300° C. at a rate of 0.5° C./min.

Example 1C

Manufacture of Protonated $Ca(Sc_{0.1}Ti_{0.9})O_3$

The procedure of Example 1A is followed except that $BaCO_3$ is replaced with 100.08 gms $CaCO_3$.

Example 1CT

Manufacture of $Ca(Sc_{0.1}Ti_{0.9})O_{2.9575}(V_o)_{0.0425}(H^*)_{0.015}$

The procedure of example 1C is followed except that the sintered disk produced as in example 1C is exposed to steam flowing at 0.001 CFM in a tube furnace at 1000 PSI during a slow cool from 900° C. to 200° C. at a rate of 0.1° C./min.

Example 1CU

Manufacture of $Ca(Sc_{0.1}Ti_{0.9})O_{2.955}(V_o)_{0.045}(H^*)_{0.010}$

The procedure of example 1C is followed except that the sintered disk produced as in example 1C is exposed to steam flowing at 0.001 CFM in a tube furnace at 1000 PSI during a slow cool from 900° C. to 300° C. at a rate of 0.1° C./min.

Example 1D

Manufacture of Protonated $Pb(Sc_{0.1}Ti_{0.9})O_3$

The procedure of example 1A is followed except that $BaCO_3$ is replaced with 267.2 gms $PbCO_3$.

Example 1DT

Manufacture of $Pb(Sc_{0.1}Ti_{0.9})O_{2.9575}(V_o)_{0.0425}(H^*)_{0.015}$

The procedure of example 1D is followed except that the sintered disk produced as in example 1D is exposed to steam flowing at 0.001 CFM in a tube furnace at 100 PSI during a slow cool from 900° C. to 200° C. at a rate of 0.5° C./min.

Example 1DU

Manufacture of $Pb(Sc_{0.1}Ti_{0.9})O_{2.955}(V_o)_{0.045}(H^*)_{0.010}$

The procedure of example 1D is followed except that the sintered disk produced as in example 1D is exposed to steam flowing at 0.001 CFM in a tube furnace at 100 PSI during a slow cool from 900° C. to 300° C. at a rate of 0.5° C./min.

Example 1E

Manufacture of Protonated $Ba(Zr_{0.8}Y_{0.2})O_3$ 197.3 gms of $BaCO_3$, 98.576 gms of $ZrO_2$ and 22.581 gms of $Y_2O_3$ starting materials of 99.9% purity or more from Sigma-Aldrich are mixed by ball milling in ethanol for 24 hrs and dried. The resulting dried powder is successively calcined at 1050° C. for 10 hrs, at 1150° C. for 10 hrs, at 1250° C. for 10 hrs, at 1400° C. for 10 hrs, and then at 1500° C. for 10 hrs to form $Ba(Zr_{0.8}Y_{0.2})O_{2.9}(V_O)_{0.1}$ where $V_O$ is oxygen site vacancy.

The $Ba(Zr_{0.8}Y_{0.2})O_{2.9}(V_O)_{0.1}$ and 2% wt ZnO based on the weight of $Ba(Zr_{0.8}Y_{0.2})O_{2.9}(V_O)_{0.1}$ is ball-milled in ethanol for 24 hrs with yttria-stabilized zirconia balls to form a slurry of milled powder that has a particle size of 1 micron or less. The milled powder is dried at 80° C. and then uniaxially pressed at 15,000 PSI to produce a preform. The preform then is isostatically compressed at 30,000 PSI. The resulting preform is sintered at 1550° C. for 10 hrs to produce sintered $Ba(Zr_{0.8}Y_{0.2})O_{2.9}(V_O)_{0.1}$ The sintered $Ba(Zr_{0.8}Y_{0.2})O_{2.9}(V_O)_{0.1}$ is polished to form a thin disk and exposed to steam at 15 PSI flowing at 0.01 CFM in a tube furnace while cooled from 900° C. to 20° C. at 0.5° C./min to produce protonated $Ba(Zr_{0.8}Y_{0.2})O_3$.

Example 1ET

Manufacture of $Ba(Zr_{0.8}Y_{0.2})O_{2.925}(V_o)_{0.075}(H^*)_{0.05}$

The procedure of example 1E is followed except that the disk produced as in example 1E is exposed to steam at 15 PSI flowing at 0.01 CFM in a tube furnace while cooled from 900° C. to 400° C. at 0.5° C./min.

Example 1EU

Manufacture of $Ba(Zr_{0.8}Y_{0.2})O_{2.93}(V_o)_{0.07}(H^*)_{0.06}$

The procedure of example 1E is followed except that the disk produced as in example 1E is exposed to steam at 15 PSI flowing at 0.01 CFM in a tube furnace while cooled from 900° C. to 300° C. at 0.5° C./min.

Example 1EV

Manufacture of $Ba(Zr_{0.8}Y_{0.2})O_{2.94}(V_o)_{0.06}(H^*)_{0.08}$

The procedure of example 1E is followed except that the disk produced as in example 1E is exposed to steam at 15 PSI flowing at 0.01 CFM in a tube furnace while cooled from 900° C. to 200° C. at 0.5° C./min.

Example 1EW

Manufacture of $Ba(Zr_{0.8}Y_{0.2})O_{2.97}(V_o)_{0.03}(H^*)_{0.14}$

The procedure of example 1E is followed except that the disk produced as in example 1E is exposed to steam at 15 PSI flowing at 0.01 CFM in a tube furnace while cooled from 900° C. to 100° C. at 0.5° C./min.

Example 2

Manufacture of Protonated $Ba(Sc_{0.1}(Ti_{0.85}Zr_{0.15})_{0.9})O_3$ 197.3 gms of $BaCO_3$, 61.10 gms $TiO_2$, 16.635 gms $ZrO_2$, and 6.869 gms $Sc_2O_3$ starting materials of 99.9% purity or more from Sigma-Aldrich are ball milled in a Teflon lined ball mill with yttria-stabilized-zirconia balls in ethanol for 24 hrs to form a slurry.

The slurry is dried at 80° C. for 24 hrs to produce dried powder. The dried powder is calcined successively at 1050° C. for 10 hrs, at 1150° C. for 10 hrs, at 1250° C. for 10 hrs, at 1400° C. for 10 hrs, and then at 1500° C. for 10 hrs to form $Ba(Sc_{0.1}(Ti_{0.85}Zr_{0.15})_{0.9})O_{2.95}(V_O)_{0.05}$. The $Ba(Sc_{0.1}(Ti_{0.85}Zr_{0.15})_{0.9})O_{2.95}(V_O)_{0.05}$ together with 2% wt ZnO is ball-milled in ethanol for 24 hrs with yttria-stabilized-zirconia balls to a particle size of 1 micron. The milled powder is dried at 80° C. and then uniaxially pressed at 15,000 PSI to produce a preform. The preform then is further compressed by iso-static pressing at 30,000 PSI. The resulting preform is sintered at 1550° C. for 10 hrs to produce sintered $Ba(Sc_{0.1}(Ti_{0.85}Zr_{0.15})_{0.9})O_{2.95}(V_O)_{0.05}$. The sintered $Ba(Sc_{0.1}(Ti_{0.85}Zr_{0.15})_{0.9})O_{2.95}(V_O)_{0.05}$ then is exposed to steam flowing at 0.005 CFM at 15 PSI in a tube furnace and cooled from 900° C. at 0.5° C./min to 20° C. to produce protonated $Ba(Sc_{0.1}(Ti_{0.85}Zr_{0.15})_{0.9})O_3$.

Protonated perovskite type oxides such as barium titanate type dielectrics such as protonated doped $Ba(Sc_x(Ti_{0.85}Zr_{0.15})_{1-x})O_{(3-0.5x)}$ where $0.00<x<0.40$ such as where $x=0.1$ may show enhanced low frequency effective permittivity of about 10000 relative to un-protonated dielectric. Where protons are the charge carrier species, as in protonated-doped ferroelectrics such as $Ba(Sc_{0.1}(Ti_{0.85}Zr_{0.15})_{0.9})O_3$, the relaxation response may occur at low frequencies of about 1 Hz.

Figure 2A:
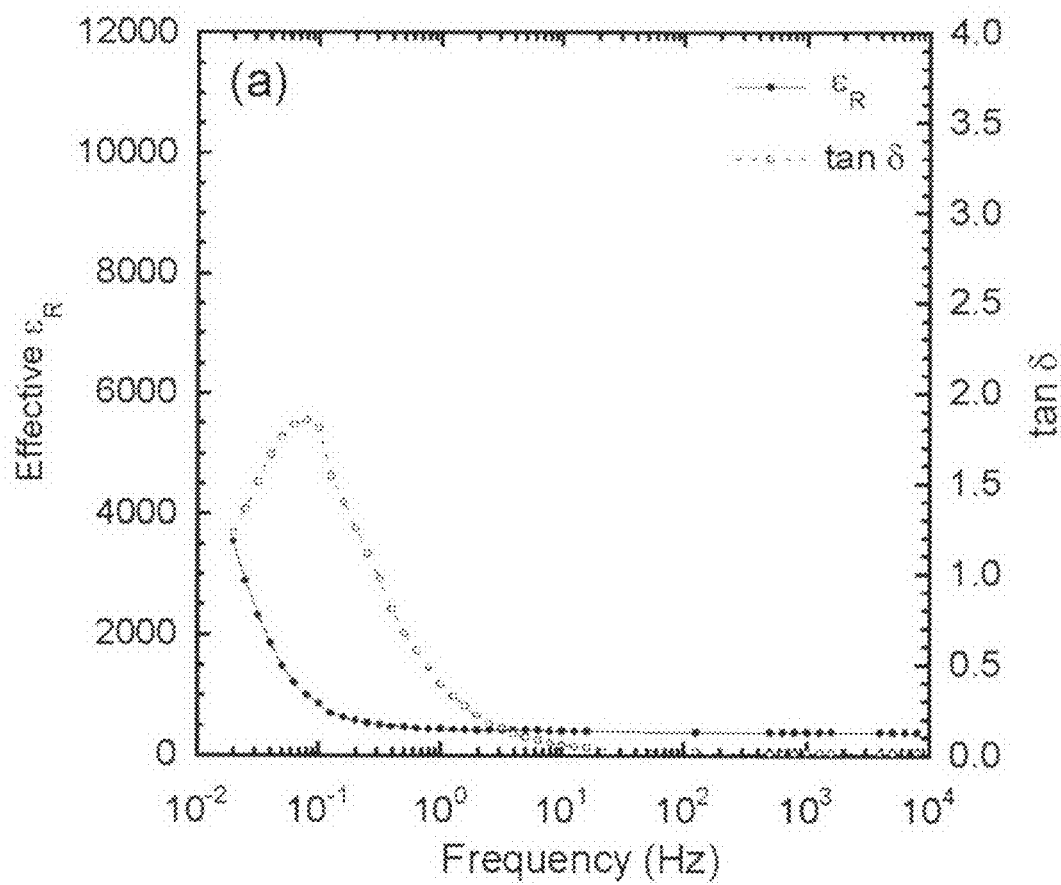
Figure 2C:
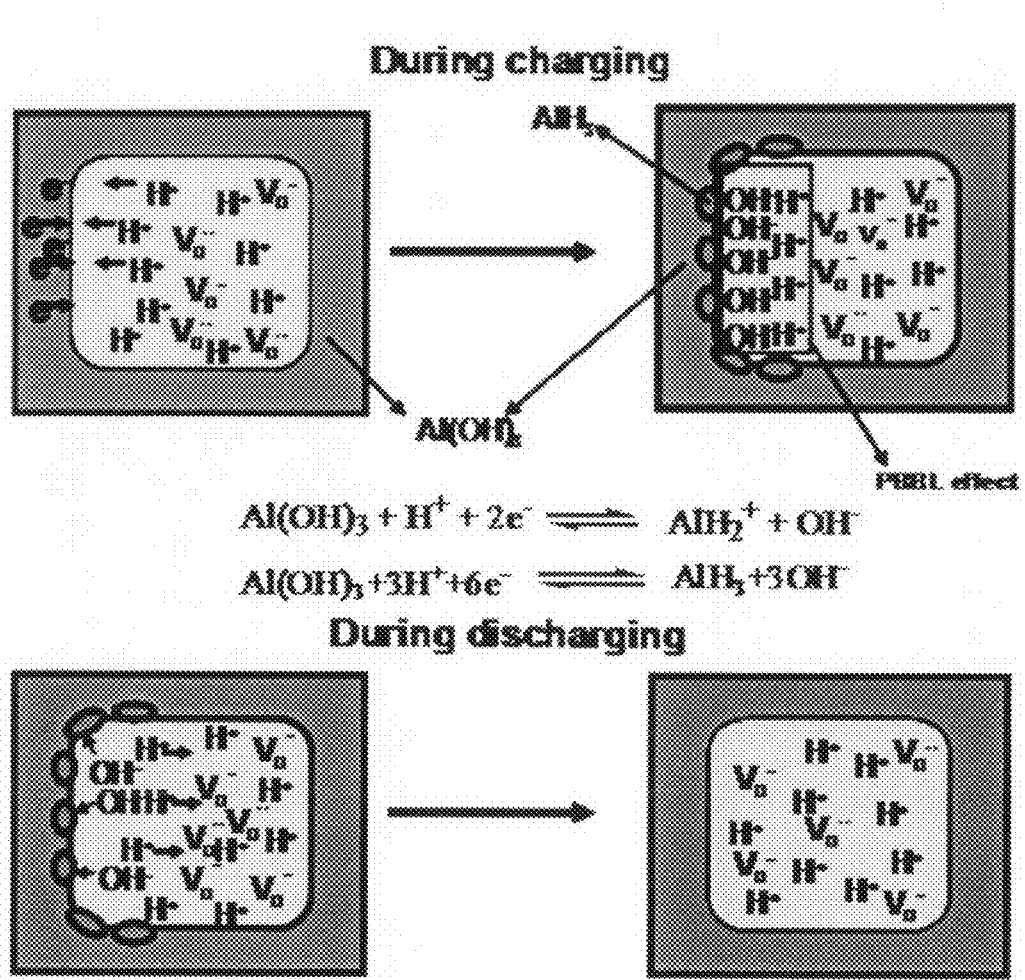
FIG. 2C is a schematic that illustrates interfacial proton electrochemical reactions.

FIG. 2 shows the effective permittivity ($\epsilon_r$) in unprotonated and protonated $Ba(Sc_{0.1}(Ti_{0.85}Zr_{0.15})_{0.9})O_3$ of example 2 over the frequency range 0.01 Hz-100 kHz. Prior to protonation (FIG. 2A), the effective permittivity at 1 Hz of unprotonated $Ba(Sc_{0.1}(Ti_{0.85}Zr_{0.15})_{0.9})O_{2.95}(V_O)_{0.05}$ dielectric is <1000. After protonation (FIG. 2B), the effective permittivity of protonated $Ba(Sc_{0.1}(Ti_{0.85}Zr_{0.15})_{0.9})O_3$ dielectric of Example 2 is 10,000. In protonated $Ba(Sc_{0.1}(Ti_{0.85}Zr_{0.15})_{0.9})O_3$ of Example 2 there is enhanced low frequency response relative to un-protonated $Ba(Sc_{0.1}(Ti_{0.85}Zr_{0.15})_{0.9})O_{2.95}(V_O)_{0.05}$ as shown in FIG. 2A, FIG. 2B. Low frequency response is measured using a Solartron SI1287 electrochemical interface/1255B frequency-response-analyzer over the frequency range $10^{-3}$ Hz-$10^6$ Hz under an oscillation voltage of 5 mV-1000 mV.

Figure 3:
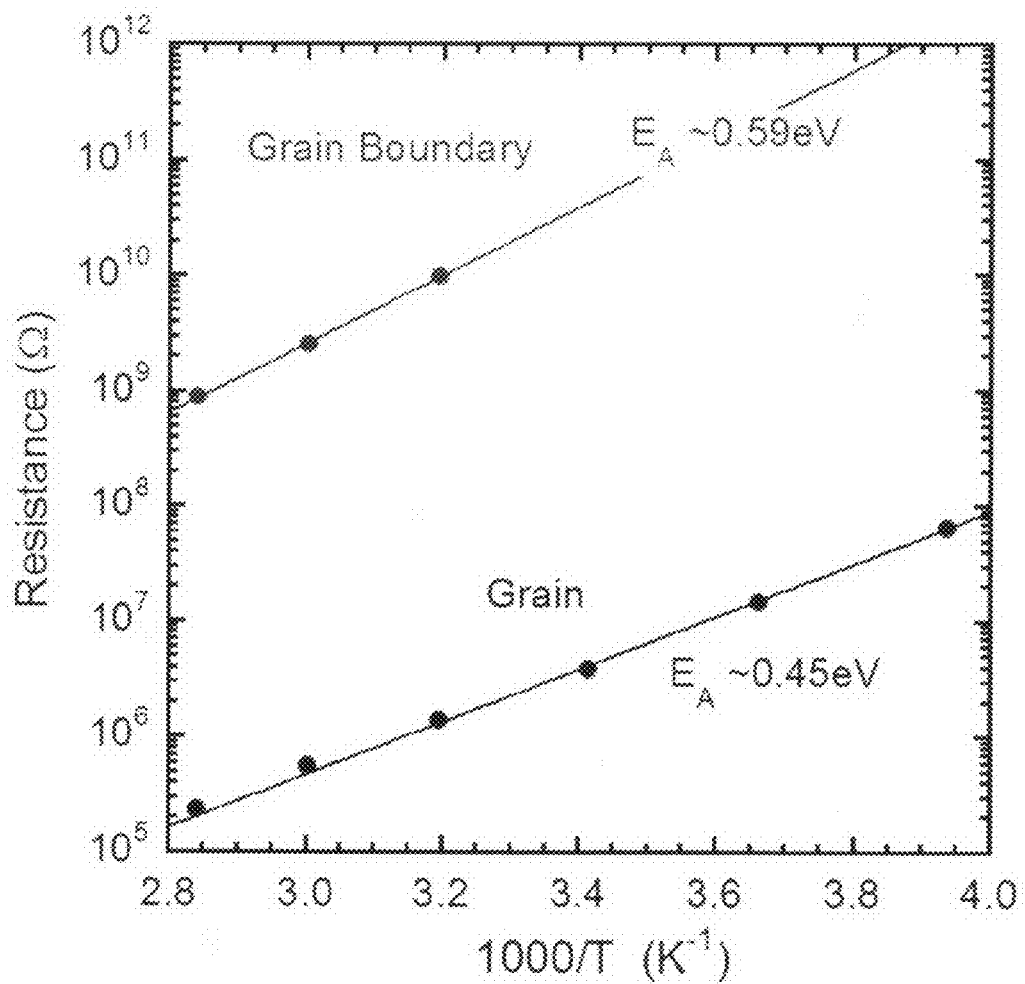
FIG. 3 shows the effective resistances of grain and grain boundary regions with associated activation energies in protonated $Ba(Sc_{0.1}(Ti_{0.85}Zr_{0.15})_{0.9})O_3$ produced by the method of example 2.

FIG. 3 shows measurements of grain and grain boundary activation energies. Measurements are made using a Solartron SI1287 electrochemical interface/1255B frequency-response-analyzer using an oscillation voltage of 1V. Protonated grain activation energy ("$E_A$") of 0.45 eV is measured for the protonated $Ba(Sc_{0.1}(Ti_{0.85}Zr_{0.15})_{0.9})O_3$ of example 2, and protonated grain boundary activation energy $E_A$ of 0.59 eV is measured for the protonated $Ba(Sc_{0.1}(Ti_{0.85}Zr_{0.15})_{0.9})O_3$ of example 2.

Figure 3A:
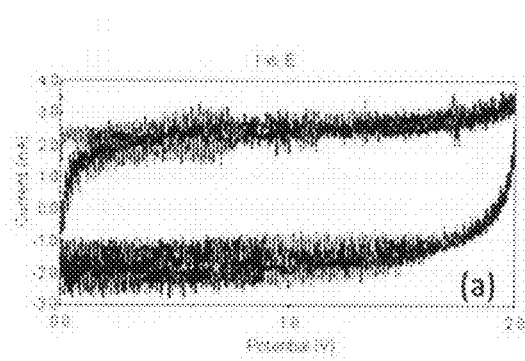
FIG. 3A shows charge transfer reactions at $Al(OH)_3$—$BaTiO_3$ grain boundaries as measured by cyclic voltammetry.
Figure 3A:
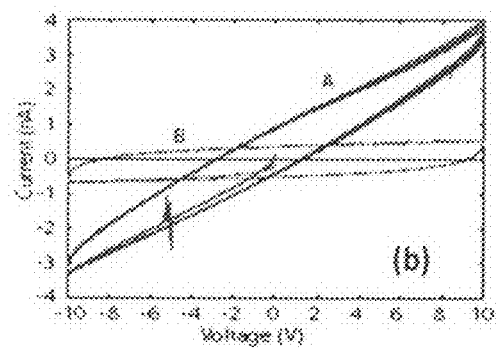

FIG. 3A(a) shows a cyclic voltammogram that shows reversible capacitive response at a solid state interface of $Al(OH)_3$/Nafion. FIG. 3A(b) shows a cyclic voltammogram that shows reversible capacitive response at a solid-state interface $Al(OH)_3$/unprotonated $Ba(Sc_{0.1}(Ti_{0.85}Zr_{0.15})_{0.9})O_3$ dielectric (Curve A) and $Al(OH)_3$/protonated $Ba(Sc_{0.1}(Ti_{0.85}Zr_{0.15})_{0.9})O_3$ of Example 2 (Curve B). Curve B shows significant reduction in leakage current compared to unprotonated $Ba(Sc_{0.1}(Ti_{0.85}Zr_{0.15})_{0.9})O_3$.

Figure 4:
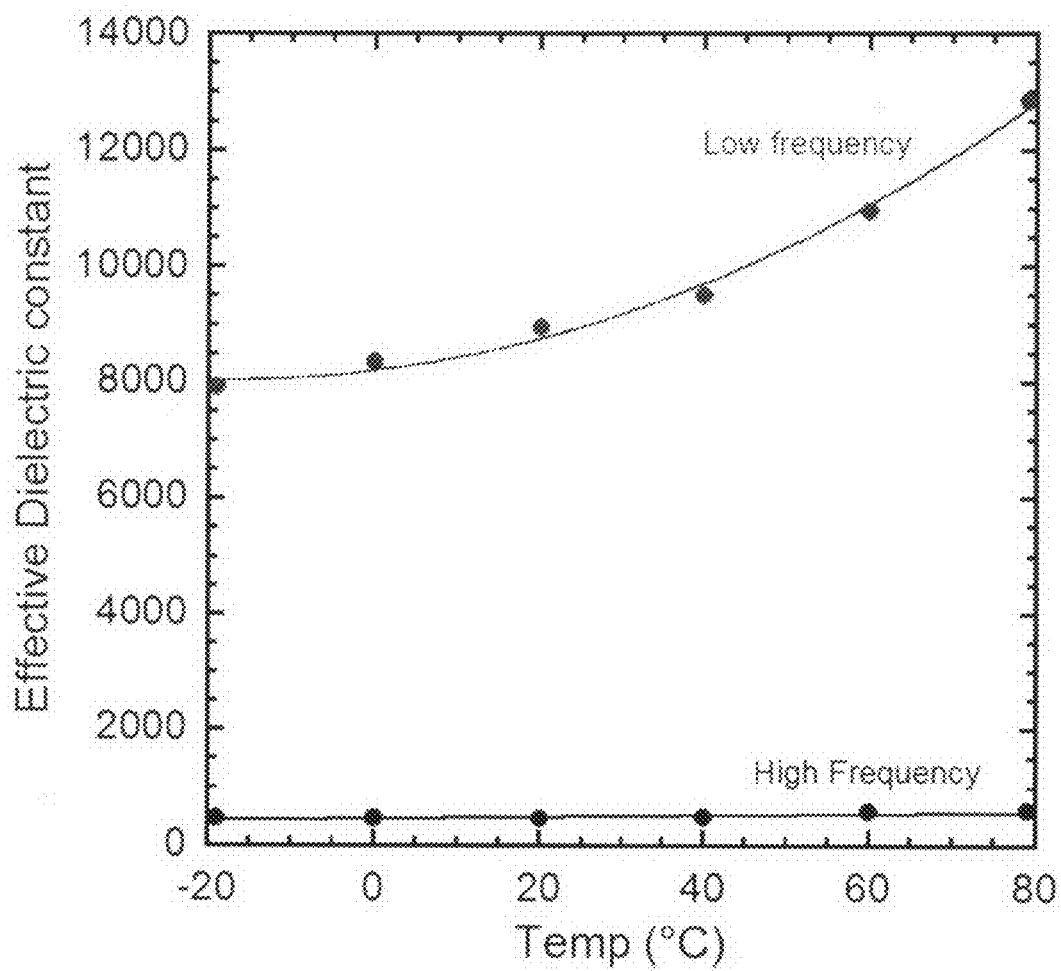
FIG. 4 shows temperature stability of effective permittivity at low frequencies and at high frequencies in protonated $Ba(Sc_{0.1}(Ti_{0.85}Zr_{0.15})_{0.9})O_3$ produced by the method of example 2.

FIG. 4 shows temperature stability of the effective permittivity due to grain boundary capacitance (low frequency) and to grain capacitance (high frequency) of the protonated $Ba(Sc_{0.1}(Ti_{0.85}Zr_{0.15})_{0.9})O_3$ of example 2, from impedance measurements made with a Solartron SI1287 electrochemical interface/1255B frequency-response analyzer.

Figure 5:
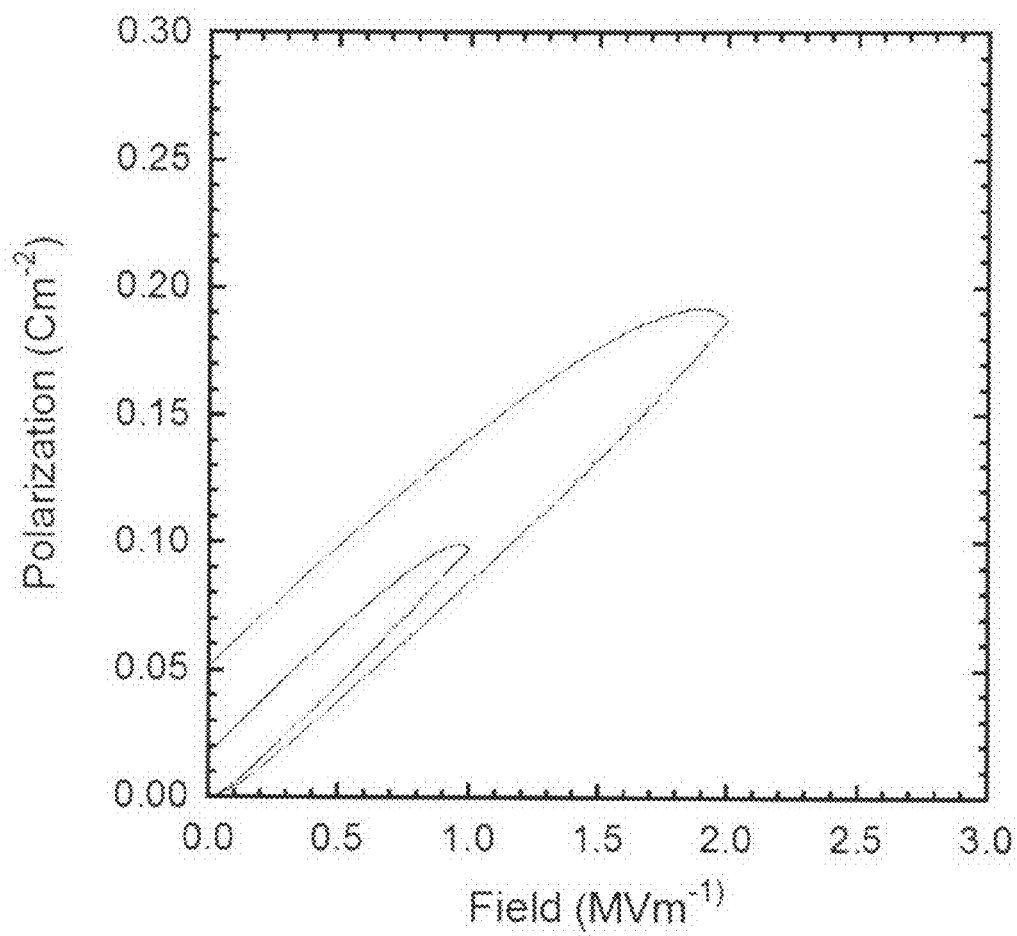
FIG. 5 shows polarization vs. electric field of protonated $Ba(Sc_{0.1}(Ti_{0.85}Zr_{0.15})_{0.9})O_3$ produced by the method of example 2.

FIG. 5 shows polarization vs. electric field of protonated $Ba(Sc_x(TiO_{0.85}Zr_{0.15})_{1-x})O_{(3-0.5x)}$ where $0.00<x<0.40$, specifically the protonated $Ba(Sc_{0.1}(TiO_{0.85}Zr_{0.15})_{0.9})O_3$ example 2. Measurements are made using a computer controlled Trek 609C-6 High Voltage amplifier coupled to a modified Sawyer-Tower circuit. The permittivity of the protonated $Ba(Sc_{0.1}(Ti_{0.85}Zr_{0.15})_{0.9})O_3$ of example 2 is linear as a function of electric field strength up to 2 MV/m. This is in contrast to the permittivity of commercial $BaTiO_3$ dielectric that shows a loss of permittivity with increased electric field strength.

Manufacture of Dielectric Materials that Show PBBL with Electrochemically Active Coatings Examples 3-3E illustrate manufacture of dielectric materials that show a PBBL effect in combination with electrochemically active coatings Example 3

10 gms of the protonated $Ba(Sc_{0.1}Ti_{0.9})O_3$ of example 1 that has a mean grain size of 1 micron is dispersed by ball milling in deionized $H_2O$ for 24 hrs. A coating solution is prepared by dissolving 1 gm of $Al(NO_3)_3 \cdot 9H_2O$ in 100 ml of de-ionized $H_2O$ to form a solution, followed by the addition of 5 gms of Urea to that solution. The protonated $Ba(Sc_{0.1}Ti_{0.9})O_3$ is then added to the coating solution and the resulting mixture is heated on a hot plate under vigorous stirring to 90° C. for 2 hrs to precipitate $Al(OH)_3$ on to the protonated $Ba(Sc_{0.1}Ti_{0.9})O_3$. After 2 hrs, the mixture is quenched under cold water and the coated, protonated $Ba(Sc_{0.1}Ti_{0.9})O_3$ powder is removed by centrifuging. The powder is then dried overnight at 120° C.

Example 3A

The procedure of example 3 is followed except that the protonated $Ba(Sc_{0.4}Ti_{0.6})O_3$ of example 1B is substituted for the protonated $Ba(Sc_{0.1}Ti_{0.9})O_3$ of example 1A.

Example 3B

The procedure of example 3 is followed except that protonated $Ca(Sc_{0.4}Ti_{0.6})O_3$ of example 1C is substituted for protonated $Ba(Sc_{0.1}Ti_{0.9})O_3$ of example 1A.

Example 3C

The procedure of example 3 is followed except that the protonated $Pb(Sc_{0.1}Ti_{0.9})O_3$ of example 1D is substituted for the protonated $Ba(Sc_{0.1}Ti_{0.9})O_3$ of example 1A.

Example 3D

The procedure of example 3 is followed except that $Co(NO_3)_3 \cdot 9H_2O$ is substituted for $Al(NO_3)_3 \cdot 9H_2O$ on a 1:1 basis.

Example 3E

The procedure of example 3 is followed except that $Ni(NO_3)_3 \cdot 9H_2O$ is substituted for $Al(NO_3)_3 \cdot 9H_2O$ on a 1:1 basis.

Manufacture of Capacitor that Employs an Ionically Conductive Dielectric Having an Electrochemically Active Coating Ionically conducting dielectric powder such as proton conducting dielectric powder is milled with a polymer binder such as polyvinyl-butyral in an organic solvent such as ethanol to yield a slurry. The slurry is tape cast onto a carrier material such as Mylar and dried. The dried tape then may be diced and screen-printed with a conductive electrode bearing ink such as aluminum, silver, copper, gold, platinum, palladium, nickel or mixtures thereof to form electrodes. The printed tape is then stacked to form multiple layers and bonded together by warm isostatic pressing to form a pressed chip. The pressed chip then may be connected electrically by removal of the edges to expose the electrodes and final termination by a conductive metallic ink.

Manufacture of an Electrochemical Cell that Employs a Dielectric that Shows a IBBL Effect such as a PBBL Effect A pseudocapacitve layer such as $Co(OH)_2$ is grown on to an anode such as Ni or Co to produce an anode assembly. A sol-gel-derived dielectric that shows a PBBL effect is coated onto the anode assembly and then heated to about 100° C. to about 1400° C. The heat treated anode assembly then is cooled to room temperature whereafter a cathode layer is applied and re-annealed if necessary. The resulting structure is then reprotonated via steam treatment at 100° C. to about 700° C.

Ionically Conducting Dielectric-Insulating Material Composites

In another aspect, ionically conducting dielectric materials such as those that show a proton barrier layer effect may be employed with one or more electrochemically active grain boundary materials and insulative materials to yield ionically conducting dielectric-insulating material composite materials. These composite materials may be employed in capacitive or energy storage applications such as portable energy storage for electric or hybrid electric vehicles, in laptop computers, flash disks, portable power tools, military hardware, surface mount capacitors, remote energy harvesting devices, grid scale energy storage.

In this aspect, an insulative material of glass, metal oxide, polymer or mixtures thereof may be applied onto the dielectric grains to achieve a desired thickness of insulative material. The insulative material may function to confine proton and electronic transport to electrochemically active grain boundary-protonated dielectric grain units such as $Al(OH)_3$-protonated dielectric grain units. The insulative materials may have a thickness of about 1 nm to about 50 nm.

Glasses that may be employed as insulative materials include but are not limited to silicates, aluminosilicates, borates, borosilicates, mixtures of glass forming oxides such as boron oxide, silicon oxide, with other metal oxides such as aluminum oxide, calcium oxide, lead oxide, zinc oxide, bismuth oxide, copper oxide, magnesium oxide and mixtures thereof.

Metal oxides that may be employed as insulative materials include but are not limited to aluminum oxide, calcium oxide, lead oxide, zinc oxide, bismuth oxide, copper oxide, magnesium oxide and mixtures thereof.

Polymers that may be employed as insulative materials include but are not limited to polyvinyl alcohol, polyvinyl butyral, polyethylene terephthalate, poly(vinylidene fluoride), polyimides and mixtures thereof.

The insulative materials may be applied onto the dielectrics by methods such as ball milling the dielectric powders with the insulative materials. The resulting milled material is dried and compressed to form green compact. The green compact may be heated to produce a higher density compact. Heating may be conducted under applied pressures of about 16 PSI to about 30000 PSI to aid densification.

Where polymers are incorporated as the insulative phase, typical heating temperatures under applied pressure are about 80° C. to about 300° C. Where glasses, or mixtures of metal oxides are incorporated as the insulative phase, typical heating temperatures under applied pressure are 500° C. to about 1400° C.

Manufacture of Composite Materials that Employ Insulative Materials

Generally, composite materials that employ insulative materials may be made by milling a protonated dielectric with an insulative glass to form a slurry. The slurry is dried to form a powder that is compressed into a green compact. The green compact then is sintered. Protonation of the sintered compact may be performed during sintering by use of a wet gas stream of air, or nitrogen or hydrogen or mixtures thereof. Alternatively, the sintered sample may be annealed for about 0.1 days to about 10 days in a wet gas flow of air, or nitrogen or hydrogen or mixtures thereof at temperatures of about 100° C. to about 1200° C. and cooled slowly over several days. The sintered body then may be formed into a capacitor by application of a suitable electrode as described above. Examples 4 illustrate manufacture of a composite materials that employ glass insulative materials Example 4

100 gms of the protonated $Ba(Sc_{0.1}Ti_{0.9})O_3$ of example 1A are milled with 7.5% wt of a zinc-borate glass in ethanol for 24 hrs to produce a slurry. The slurry is dried overnight to form a powder that is compressed into green compacts. The green compacts are heated at 4° C./min to a sintering temperature of 1100° C. and are held at 1100° C. for 2 hrs.

The composite dielectric-insulative materials may be formed into capacitors by application of an electrode material to the composite material. Electrode materials such as conductive electrode inks may be applied by methods such as painting. Sputtering or evaporation of one or more conductive metals such as Au, Al, Ag, Pt, Ni, Fe, Pd, Sn or combinations thereof and alloys thereof also may be employed to apply an electrode material. The applied electrodes may provide electrochemical capacitive contributions.

Devices that employ the composite dielectric-insulative materials may be employed in on board energy storage in hybrid vehicles, energy storage in portable devices such as laptops, cell phones, military applications and satellites.

Manufacture of Single Layer IBBL Devices

A single-layer IBBL device such as a single layer PBBL device may be constructed as follows:

A layered double hydroxide such as Co,Al(OH) that has high surface area such as of about 1 $m^2$/gm to about 1,000 $m^2$/gm is formed on a metal current collector by applying low voltage such as of about 1.5 V to deposit a layered double hydroxide material onto an anode that has a surface area of about 1 $m^2$/gm to about 1,000 $m^2$/gm. The anode having a layered double hydroxide covering then is cycled in an ionic solution such as KOH to create a hydroxide surface. The layered double hydroxide material then may be coated with metals such as Au, Sn, Pb or combinations thereof or alloys thereof or with metal oxides such as vanadium oxide, titanium oxide or combinations thereof to improve capacity and reversibility.

The hydroxide surface-bearing anode then may be coated with a sol-gel precursor of a solid-state electrolyte to provide an assembly. The assembly may be annealed at temperatures up to 1500° C. The assembly may then be reprotonated via steam treatment, wet gas flow, pressurized vessel, or electrochemical cycling. A high surface area cathode may be coated via painting a solution of particles of cobalt, $MnO_2$, Nickel, magnesium and the like. The anode also may be a high surface area dendritic growth formed by co-precipitation of aluminum and transition metals (Co, Ni, Zn, Mn), where a conductive electrode is formed by co-precipitation from (AlOOH+ AlOOH+XCoO or XNiO or XMnO, x<=0.85).

Manufacture of Devices that Employ Composite Dielectric-Insulative Materials

Composite materials that employ ionically conducting dielectric materials such as proton barrier layer materials and/or dielectric-insulative composite materials may be formed into dense bodies suitable for use in capacitors by cementitious reactions. In this aspect, a cementious material is mixed with ionically conducting dielectric such as a proton conducting dielectric. Cementious materials that may be employed include but are not limited to CaO, $SiO_2$, $Al_2O_3$, $CaSO_4$ or mixtures thereof. The amounts of cementitious material and dielectric in the mixture may vary over a broad range of about 0.1 wt % dielectric to about 50 wt % dielectric based on the total weight of the mixture. Then mixture then is ball milled in a solvent such as $H_2O$, ethanol, acetone or mixtures thereof for a period of time such as about 24 hrs to produce slurry. The slurry then may be formed into sheets by methods such as tape casting whereby the cementitious material may cause the slurry to solidify into a rigid sheet. Electrodes then may be applied to the sheet to produce a capacitor. Electrodes that may be attached may include Ni or Ag—Pd on sintered dielectrics, and Ag or Al composites of PBBL dielectrics with polymer.

Manufacture of Capacitors that Employ Electrochemically Active Coated Dielectrics that Show an IBBL Effect In manufacture of a capacitor that employs dielectrics that show an IBBL effect such as a PBBL effect, "N" electrolytically active grain boundary-dielectric units such as protonated $BaTiO_3/Al(OH)_3$ grain boundary-dielectric units may be employed in series. Cell voltage of the capacitor is distributed along the units according to $V=V_{cell}/N$ Where protonated electrolytically active grain boundary-dielectric units such as $BaTiO_3/Al(OH)_3$ grain boundary-dielectric units are employed, the effective charge stored in electrolytically active grain boundary interfaces is given by: $Q_{eff}=Q_{PBBL}+Q_{Al(OH)3/AlH3redox}$ where $Q_{PBBL}$ is the charge related to the PBBL effect and $Q_{Al(OH)3/AlH3redox}$ is the charge related to the electrochemically active phase. As a result, $((C_{eff}V_{cell})/N)=C_{PBBL}V_{PBBL}+C_{PSEUDO}\eta_{OVERPOTENTIAL}$ and the effective capacitance of a capacitor that employs ionically conducting dielectrics that show and IBBL effect such as a PBBL effect may be expressed as $$C_{eff} = N\left[\frac{C_{PBBL}V_{PBBL}}{V_{cell}} + \frac{C_{PSEUDO}\eta_{OVERPOTENTIAL}}{V_{cell}}\right]$$

where $C_{PBBL}$ is the capacitance associated with the PBBL effect, $V_{PBBL}$ is the voltage associated with the PBBL effect, $C_{PSEUDO}$ is the capacitance associated with the electrochemical phase and $\eta_{OVERPOTENTIAL}$ is the voltage associated with the electrochemical phase.

$C_{PBBL}$, $C_{PSEUDO}$ and $\eta_{OVERPOTENTIAL}$ may be managed by controlling the extent of protonation of dielectrics such as $BaTiO_3$ and the thickness of electrolytically active grain boundary materials such as $Al(OH)_3$ layer at the grain boundaries. The thicknesses of electrolytically active grain boundary material layers depend on the intrinsic values of $C_{PSEUDO}$ and $\eta_{OVERPOTENTIAL}$ of the grain boundary material.

Overall capacitance of a capacitor that employs electrolytically active grain boundary-dielectric units is defined by $C_{OVERALL}=C_{EFF}(\#_{PARALLEL}/\#_{SERIES})$ where $\#_{PARALLEL}$ represents the number of electrolytically active grain boundary-dielectric units in a parallel configuration and $\#_{SERIES}$ represents the number of electrolytically active grain boundary-dielectric units in a series configuration. The number of series arrangements of electrolytically active grain boundary-dielectric units and the number of parallel arrangements electrolytically active grain boundary-dielectric units may be controlled by grain size, layer area, and layer thickness. The number of series arrangements is defined as a function of layer thickness and the grain size, i.e. the number of series arrangements is defined as the layer thickness divided by the grain size. Similarly, the number of parallel arrangements is defined as the layer area divided by the square of the grain size.

Overall capacitance of a capacitor that employs dielectric materials that show an IBBL effect such as a PBBL effect may be managed by varying the length, breadth, thickness and number of layers in the capacitor. Energy densities of about (1000 J/cc) may be achieved in a capacitor that has an overall capacitance of about 1 mF and an operating cell voltage of about 500 V in a multilayer device for a grain size of about 0.1 microns. Ionically conducting dielectrics that show an IBBL effect such as a PBBL effect may possess high effective permittivity of about 10,000 that is invariant to field strength up to 2 MV/m.

Ionically conducting dielectrics that show an IBBL effect such as a PBBL effect that employ any one or more of electrochemically active grain boundary material such as electrochemically active grain boundary metal hydroxides such as $Al(OH)_3$ at grain boundaries may generate electrochemical reactions between the electrochemically active grain boundary material composition and the grain to generate pseudo capacitance. These reactions may yield increased capacitance, capture electronic carriers, and enable operation at higher voltages.

Ionically conducting dielectric materials that show an IBBL effect such as a PBBL effect may enable the tripling of effective permittivity. This may occur by coupling of IBBL effects such as PBBL effects of Ionically conducting such as protonated dielectrics and the electrochemical effects of electrochemically active grain boundary materials such as $Al(OH)_3$ at grain boundaries. Thus, where a protonated dielectric that has an effective permittivity of 10,000 attributed to proton barrier effects is employed in combination with electrochemically active grain boundary material such as $Al(OH)_3$ at the grain boundaries, the effective permittivity may increase to about 30,000 at dielectric grain sizes of as small as about 0.1 micron. Overpotentials of about 2V to about 5V, and pseudocapacitances of about 1 nF at grain boundaries, and a specific capacitance of about 300 F/g also may be achieved. This may enable achievement of breakdown voltages of about 2 volts to about 5 volts and an electrostatic energy density of about 1000 J/cc.

The invention claimed is:

1. A dielectric composition comprising a compound of the formula $[(M')_{1-x}(A')_x][(M'')_{1-y-z}(B'')_y(C'')_z]O_{3-\delta}(V_O)_\delta$ where $0.0 \le x \le 0.4$, $0.00 \le y \le 0.40$, $0.00 \le z \le 0.40$, M' is selected from the group consisting of, Mg, Ca, Pb and mixtures thereof, A' is selected from the group consisting of K, Na, Li, Ag and mixtures thereof, M" is selected from the group consisting of Ti, Zr, Hf, Sn, $(Mg_{1/3},Nb_{2/3})$, $(Zn_{1/3},Nb_{2/3})$, $(Sc_{1/2},Ta_{1/2})$ and mixtures thereof, B" is selected from the group consisting of, Al, Y, La, Fe, Ho, Tm, Sb, Sm, Gd, Er, Pr, Mo, Dy and mixtures thereof, C" is selected from the group consisting of V, Mn, Cr, Fe, Ni, Cu, Zn, Ca, Mg and mixtures thereof, $(VO)_\delta$ represents oxygen vacancies and $\delta \le 0.5x+0.5y+z$ wherein an accumulation of ions is present at grain boundaries present in the compound.

2. A protonated dielectric compound within the formula $[(M')_{1-x}(A')_x](M'')_{1-y-z}(B'')_y(C'')_z]O_{3-\delta+h}(V_o)_\delta(H^\bullet)_{2h}$ where $0.0 \leq x \leq 0.4$, $0.00 \leq y \leq 0.40$, $0.00 \leq z \leq 0.40$, M' is selected from the group consisting of, Mg, Ca, Pb and mixtures thereof, A' is selected from the group consisting of K, Na, Li, Ag and mixtures thereof, M'' is selected from the group consisting of Ti, Hf, Sn, $(Mg_{1/3},Nb_{2/3})$, $(Zn_{1/3},Nb_{2/3})$, $(Sc_{1/2},Ta_{1/2})$ and mixtures thereof, B'' is selected from the group consisting of Al, Y, La, Fe, Ho, Tm, Sb, Sm, Gd, Er, Pr, Mo, Dy and mixtures thereof, C'' is selected from the group consisting of V, Mn, Cr, Fe, Ni, Cu, Zn, Ca, Mg and mixtures thereof, $(VO)_\delta$ represents oxygen vacancies and $0.00 < h \leq \delta \leq 0.5x+0.5y+z$ and H* is a proton wherein an accumulation of protons is present at grain boundaries present in the compound.

3. A protonated dielectric compound within the formula of claim 2 wherein the compound is protonated $Ba(Sc_{0.1}(Ti_{0.85}Zr_{0.15})_{0.9})O_3(V_o)_5(H^\bullet)_{2h}$ wherein the protonated $Ba(Sc_{0.1}(Ti_{0.85}Zr_{0.15})_{0.9})O_3$ shows a PBBL effect.

4. A protonated dielectric compound within the formula of claim 2 wherein the compound is protonated $Ba(Sc_{0.1}Ti_{0.9})O_3(V_o)_\delta(H^\bullet)_{2h}$.

5. A protonated dielectric compound within the formula of claim 2 wherein the compound is protonated $Ca(Sc_{0.1}(Ti_{0.85}Zr_{0.15})_{0.9})O_3(V_o)_\delta(H^\bullet)_{2h}$.

6. A protonated dielectric compound within the formula $[(M')_{1-x}(A')_x](M'')_{1-y-z}(B'')_y(C'')_z]O_{3-\delta+h}(V_o)_\delta(H^\bullet)_{2h}$ where $0.0 \leq x \leq 0.4$, $0.00 \leq y \leq 0.40$, $0.00 \leq z \leq 0.40$, M' is selected from the group consisting of Ba, Mg, Ca, Sr, Pb and mixtures thereof, A' is selected from the group consisting of K, Na, Li, Ag and mixtures thereof, M'' is selected from the group consisting of Ti, Zr, Hf, Ce, Sn, $(Mg_{1/3},Nb_{2/3})$, $(Zn_{1/3},Nb_{2/3})$, $(Sc_{1/2},Ta_{1/2})$ and mixtures thereof, B'' is selected from the group consisting of Sc, Al, Y, La, Fe, Yb, Ho, Tm, Sb, Sm, Nd, Gd, Er, Pr, Mo, Dy and mixtures thereof, C'' is selected from the group consisting of V, Mn, Cr, Fe, Ni, Cu, Zn, Ca, Mg and mixtures thereof, $(VO)_\delta$ represents oxygen vacancies and $0.00 < h \leq \delta \leq 0.5x+0.5y+z$ and H* is a proton wherein the compound is protonated $Pb(Sc_{0.1}(Ti_{0.85}Zr_{0.15})_{0.9})O_3(V_o)_\delta(H^\bullet)_{2h}$.

7. A protonated dielectric compound within the formula of claim 2 wherein the compound is protonated $Ba(Zr_{0.8}Y_{0.2})O_3(V_o)_\delta(H^\bullet)_{2h}$.

8. A protonated dielectric compound within the formula $(A_{1-x}A'_x)(B_{1-y-z}B''_yC''_z)O_3H^*_{(x+y+2z)}$ where $0.00 < x < 0.40$, $0.00 < y < 0.40$ and $0.00 < z < 0.40$, A is selected from the group consisting of Ba, Mg, Ca, Sr, Pb and mixtures thereof, A' is selected from the group consisting of K, Na, Li, Ag and mixtures thereof, B is selected from the group consisting of Ti, Zr, Hf, Sn, $(Mg_{1/3},Nb_{2/3})$, $(Zn_{1/3},Nb_{2/3})$, $(Sc_{1/2},Ta_{1/2})$ and mixtures thereof, B'' is selected from the group consisting of Sc, Y, La, Fe, Yb, Ho, Tm, Sb, Sm, Nd, Gd, Er, Pr, Mo, Dy and mixtures thereof, C'' is selected from the group consisting of V, Mn, Cr, Fe, Ni, Cu, Ca, Mg and mixtures thereof, and H* is a proton.

9. An energy storage device comprising the dielectric material of any one of claims 1-7.

10. The device of claim 9 wherein the device is any one of capacitors, batteries and fuel cells.

11. The device of claim 10 wherein the device is a capacitor comprising a dielectric material for generating an IBBL effect and metal electrodes that employ metals selected from the group consisting of Cu, Al, Au, Ag, Ni, Co, Fe, Cr, Pt, Pd, alloys thereof and mixtures thereof.

12. The device of claim 11 wherein at least one metal electrode is electrochemically active with an ionic species in the dielectric material to enable generation of pseudocapacitance.

13. An energy generation device comprising the dielectric material of any one of claims 1-8.

14. The device of claim 10 wherein the device is a fuel cell.

15. A multilayer capacitor comprising a dielectric compound comprising the protonated compound within the formula $[(M')_{1-x}(A')_x](M'')_{1-y-z}(B'')_y(C'')_z]O_{3-\delta+h}(V_o)_\delta(H^\bullet)_{2h}$ where $0.0 \leq x \leq 0.4$, $0.00 \leq y \leq 0.40$, $0.00 \leq z \leq 0.40$, M' is selected from the group consisting of Ba, Mg, Ca, Sr, Pb and mixtures thereof, A' is selected from the group consisting of K, Na, Li, Ag and mixtures thereof, M'' is selected from the group consisting of Ti, Zr, Hf, Ce, Sn, $(Mg_{1/3},Nb_{2/3})$, $(Zn_{1/3},Nb_{2/3})$, $(Sc_{1/2},Ta_{1/2})$ and mixtures thereof, B'' is selected from the group consisting of Sc, Al, Y, La, Fe, Yb, Ho, Tm, Sb, Sm, Nd, Gd, Er, Pr, Mo, Dy and mixtures thereof, C'' is selected from the group consisting of V, Mn, Cr, Fe, Ni, Cu, Zn, Ca, Mg and mixtures thereof, $(VO)_\delta$ represents oxygen vacancies and $0.00 < h \leq \delta \leq 0.5x+0.5y+z$ and H* is a proton wherein the compound is protonated $Pb(Sc_{0.1}(Ti_{0.85}Zr_{0.15})_{0.9})O_3(V_o)_\delta(H^\bullet)_{2h}$.

16. A protonated dielectric compound of claim 8 within the formula $(A_{1-x}A'_x)(B_{1-y-z}B''_yC''_z)O_3H^*_{(x+y+2z)}$ where $0.00 < x < 0.40$, $0.00 < y < 0.40$ and $0.00 < z < 0.40$, A is selected from the group consisting of Ba, Mg, Ca, Sr, Pb and mixtures thereof, A' is selected from the group consisting of K, Na, Li, Ag and mixtures thereof, B is selected from the group consisting of Ti, Zr, $(Mg_{1/3},Nb_{2/3})$, $(Zn_{1/3},Nb_{2/3})$, $(Sc_{1/2},Ta_{1/2})$ and mixtures thereof, B'' is selected from the group consisting of Sc, Y, La, Fe, Yb, Ho, Tm, Sb, Sm, Nd, Gd, Er, Pr, Mo, Dy and mixtures thereof, C'' is selected from the group consisting of V, Mn, Cr, Fe, Ni, Cu, Ca, Mg and mixtures thereof, and H* is a proton.

* * * * *